(12) United States Patent
Henle et al.

(10) Patent No.: US 8,260,015 B2
(45) Date of Patent: Sep. 4, 2012

(54) PEAK REASSEMBLY

(75) Inventors: Ernst S. Henle, Issaquah, WA (US); Brandon T. Hunt, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 782 days.

(21) Appl. No.: 12/313,222

(22) Filed: Nov. 17, 2008

(65) Prior Publication Data
US 2009/0141954 A1 Jun. 4, 2009

Related U.S. Application Data

(60) Provisional application No. 61/052,584, filed on May 12, 2008.

(51) Int. Cl.
*G06K 9/00* (2006.01)
(52) U.S. Cl. ........................................ 382/128; 382/130
(58) Field of Classification Search .................. None
See application file for complete search history.

(56) References Cited

U.S. PATENT DOCUMENTS

| | | | | |
|---|---|---|---|---|
| 5,818,977 | A * | 10/1998 | Tansley | 382/294 |
| 7,839,422 | B2 * | 11/2010 | Agarwala | 345/629 |
| 2004/0241670 | A1 | 12/2004 | Ghosh | |
| 2005/0288872 | A1 | 12/2005 | Old | |
| 2007/0211928 | A1 | 9/2007 | Weng | |
| 2008/0037897 | A1 | 2/2008 | Chiang | |

OTHER PUBLICATIONS

International Search Report and Written Opinion for PCT/US09/43671 dated Jun. 29, 2009, 6 pages.

* cited by examiner

*Primary Examiner* — Minh N Tang
(74) *Attorney, Agent, or Firm* — Klarquist Sparkman, LLP

(57) ABSTRACT

In differential and non-differential analyses, composite images derived from replicates of liquid-chromatography/mass-spectrometry processes can provide scientists with a better signal-to-noise ratio in discovering biological features of interest. Certain distinct peaks in composite images point to distinct biological features but some distinct peaks in composite images may also point to biological features that have common chemical species ancestry. A peak reassembly process is used to indicate whether two adjacent peaks should point to a biological feature using complementation analysis and collision analysis.

18 Claims, 30 Drawing Sheets
(10 of 30 Drawing Sheet(s) Filed in Color)

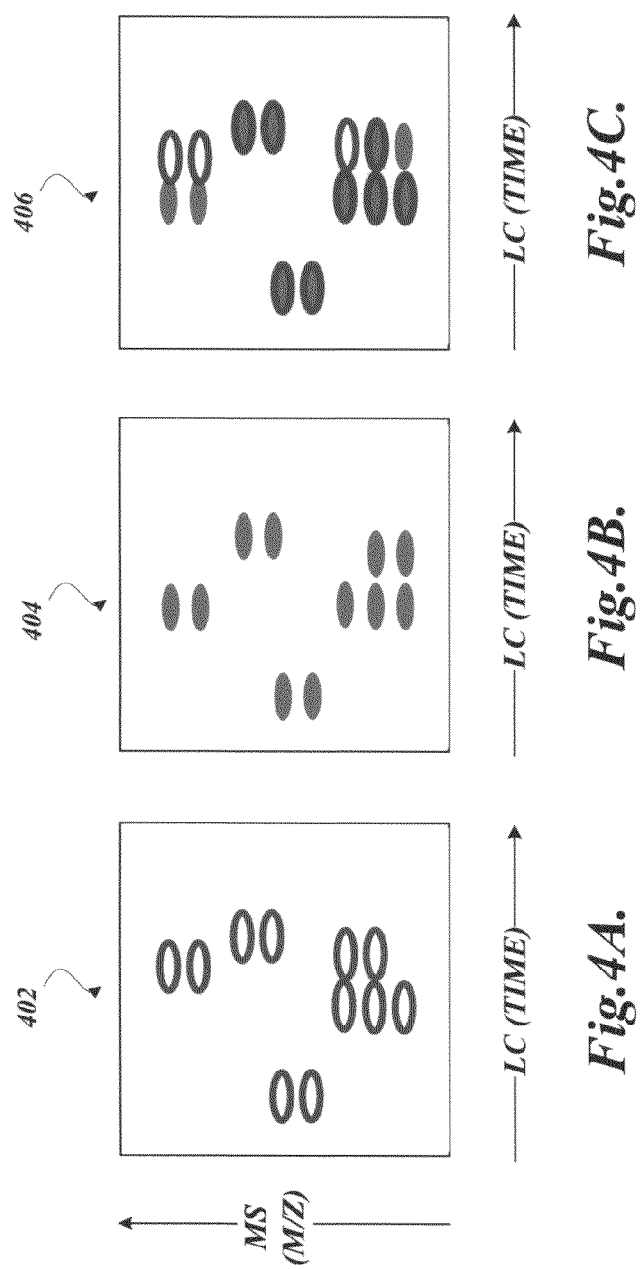

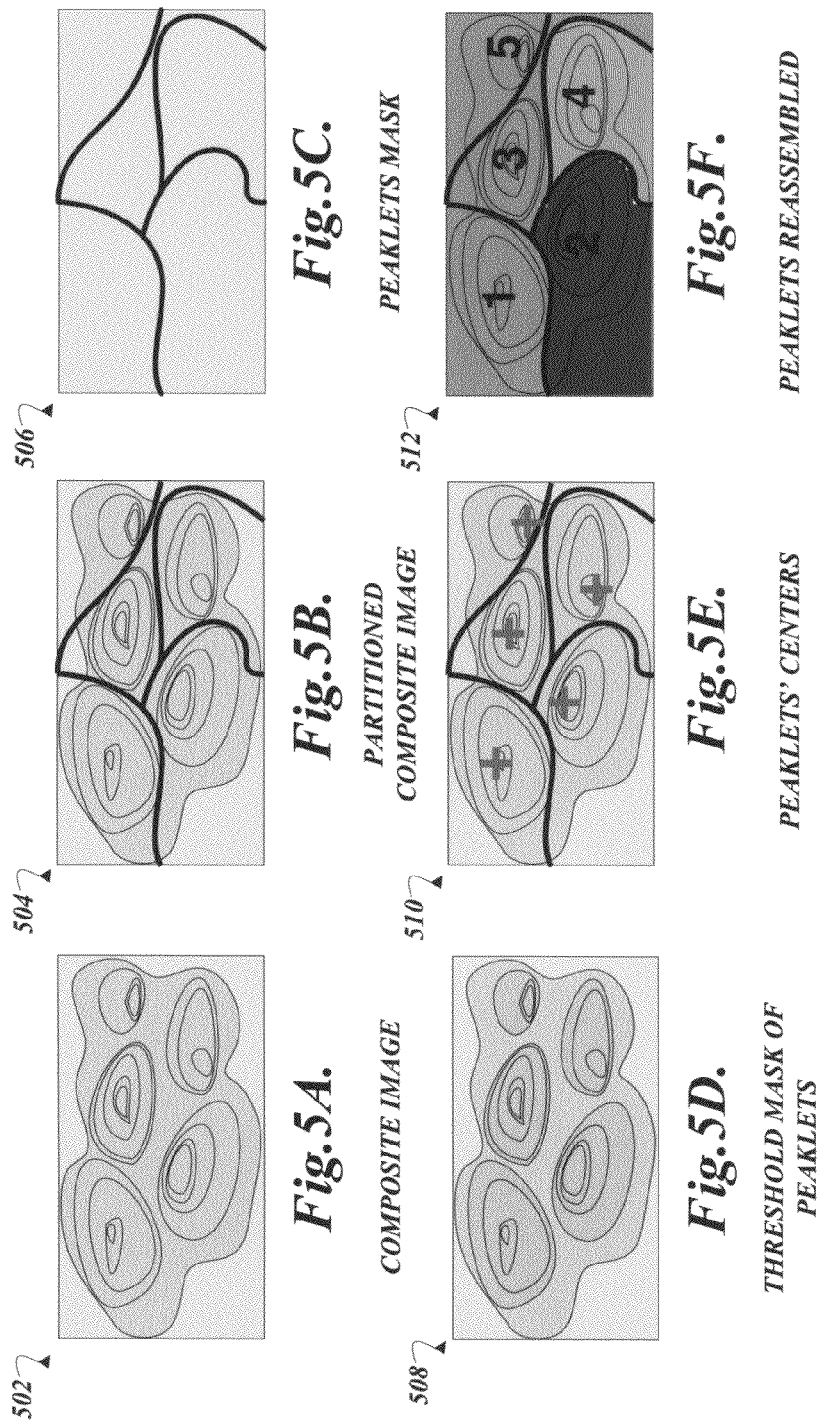

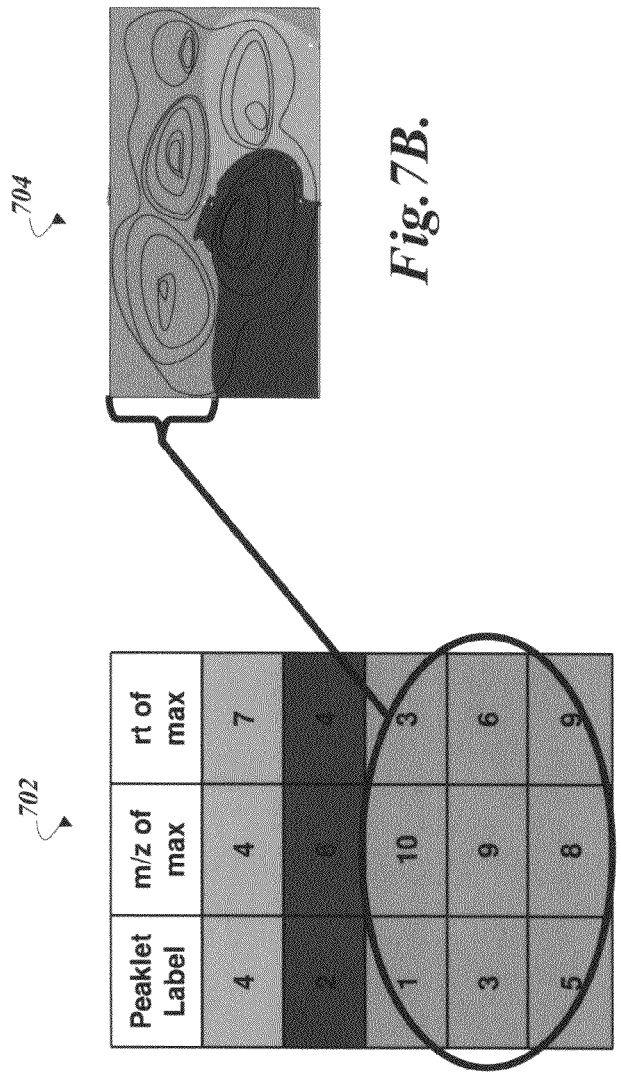
*Fig. 7A.* *Fig. 7B.*

US 8,260,015 B2

PEAK REASSEMBLY

CROSS-REFERENCE TO A RELATED APPLICATION

This application claims the benefit of U.S. Provisional Patent Application No. 61/052,584, filed May 12, 2008, which is incorporated herein by reference.

BACKGROUND

A digital image is a visual representation formed from pixels of various intensities. A composite image formed from multiple replicates, which are digital images capturing biological samples undergoing an experiment, contains locations that exhibit higher intensities than others called peaks. Although it seems natural to assume that distinct peaks reveal distinct biological features, some distinct peaks may actually point to one biological feature. The problem is distinguishing peaks that reveal different biological features from peaks that reveal the same biological feature.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One aspect of the discussed subject matter includes a system for reassembling peaks, which comprises a peaklets assembler configured to form an assemblage of peaks. The assemblage starts from a seed peak to identify other adjacent peaks of the assemblage with a similar mass/charge ratio within a calculated tolerance. The system further includes a peaks reassembler configured to create chromatograms from replicates that form a composite image in a defined image region that contains the assemblage. The peaks reassembler reassembles peaks to point to a biological feature when a computed bi-directional complementation strength, together with a computed uni-directional complementation strength, is greater than a computed collision strength.

Another aspect of the subject matter includes a computer-implemented method, which comprises aligning replicates in a retention time dimension to overlay peaks in one replicate with peaks in another replicate resulting in aligned peaks and non-aligned peaks. The method further comprises reassembling adjacent peaks that are part of an assemblage found in a composite image of the replicates if a computed bidirectional complementation strength, together with a computed uni-directional complementation strength, is greater than a computed collision strength.

A further aspect of the subject matter includes a computer-readable medium having stored thereon computer-executable instructions for implementing a method, which comprises aligning replicates in a retention time dimension to overlay peaks in one replicate with peaks in another replicate resulting in aligned peaks and non-aligned peaks. The method further comprises reassembling adjacent peaks that are part of an assemblage found in a composite image of the replicates if a computed bi-directional complementation strength, together with a computed uni-directional complementation strength, is greater than a computed collision strength.

DESCRIPTION OF THE DRAWINGS

The patent or application file contains at least one drawing executed in color. Copies of this patent or patent application publication with color drawing(s) will be provided by the Office upon request and payment of the necessary fee. The foregoing aspects and many of the attendant advantages of this invention will become more readily appreciated as the same become better understood by reference to the following detailed description, when taken in conjunction with the accompanying drawings, wherein:

FIGS. 4A-4C are pictorial diagrams illustrating exemplary peaks in multiple replicates;

FIGS. 5A-5F are pictorial diagrams illustrating exemplary composite images undergoing various processing steps;

FIG. 7A is a pictorial diagram illustrating an exemplary table of sorted peaklets;

FIG. 7B is another pictorial diagram illustrating an exemplary reassembled composite image;

DETAILED DESCRIPTION

Various embodiments provide differential or non-differential analyses of liquid-chromatography/mass-spectrometry (LC/MS) data in the form of digital images. Suitably, LC/MS data, and especially its peaks, are time aligned to allow better quantified comparison of experimental treatment groups. Because time alignment may be imperfect to compensate for variations in chromatography or changes in the order of eluting chemical species, a single ion may be represented by multiple peaks at different retention times, each from a different image, thus complicating detection of biological features for differential or non-differential analyses. In addition, even a small residual misalignment can complicate identification of unique ions that have similar mass-to-charge ratios and retention times, and this misalignment may errantly combine unique ions that should remain distinct.

Various embodiments create a composite representation (a composite image) of sample intensity images (replicates) referenced by three dimensions of mass-to-charge ratio, retention time, and pixel intensities. Various embodiments of the present invention detect peaks and thereby regions of significant intensity that may contain all or some of the aligned as well as non-aligned peaks from a single ion. Various embodiments, while continuing to analyze the composite representation, also analyze data of the replicates to reveal corroboration to differentiate between distinct peaks that point to distinct biological features and distinct peaks that point to similar biological features. Adjacent peaks can be reassembled when various embodiments determine that the adjacent peaks originate from a single ion ancestry. Peak reassembly results in revised sets of peaks that better represent expression profiles of ions thereby assisting in detecting biological features of interest.

Figure 1:
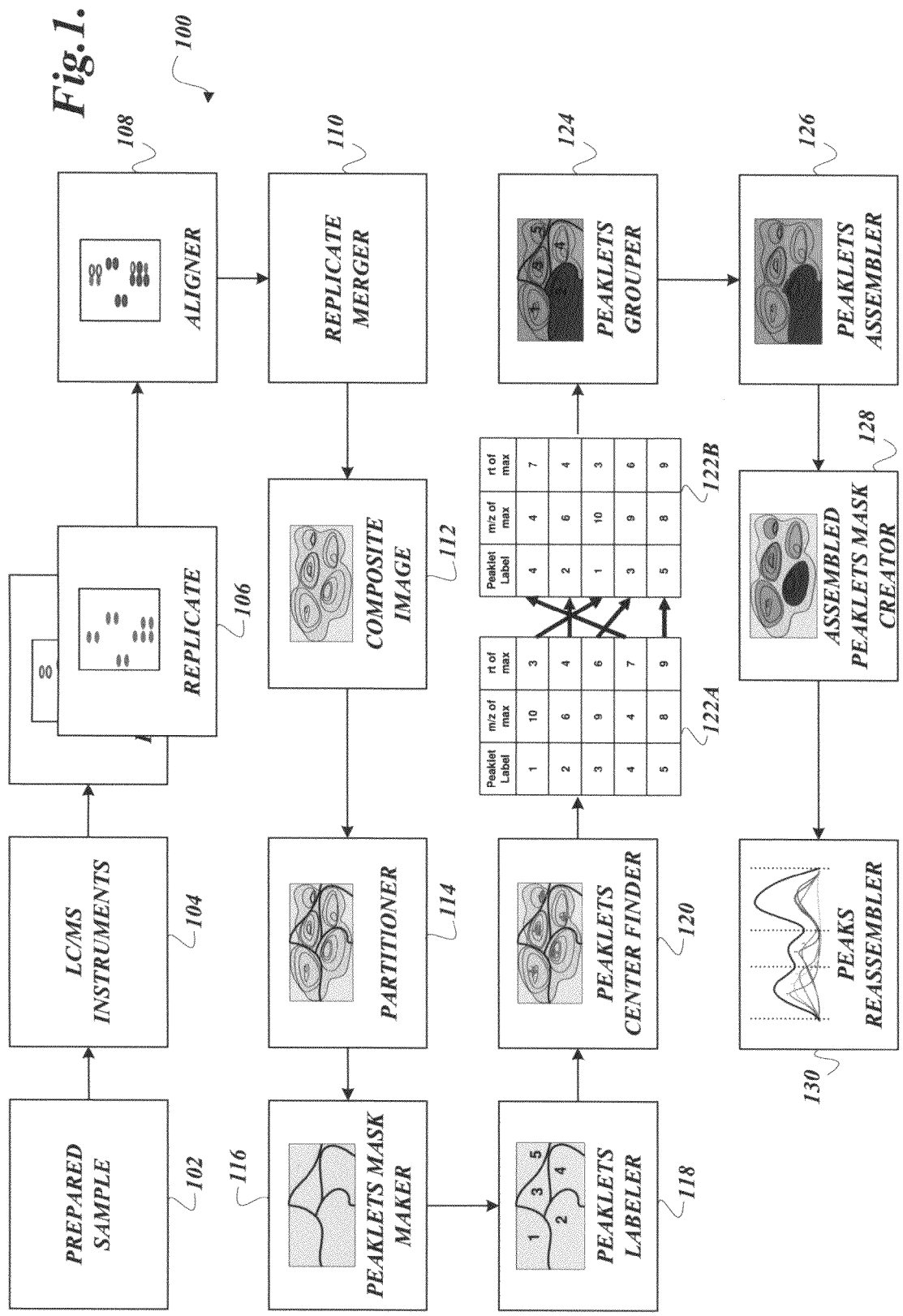
FIG. 1 is a block diagram illustrating an exemplary system for reassembling peaks to discover biological features.
Figure 2:
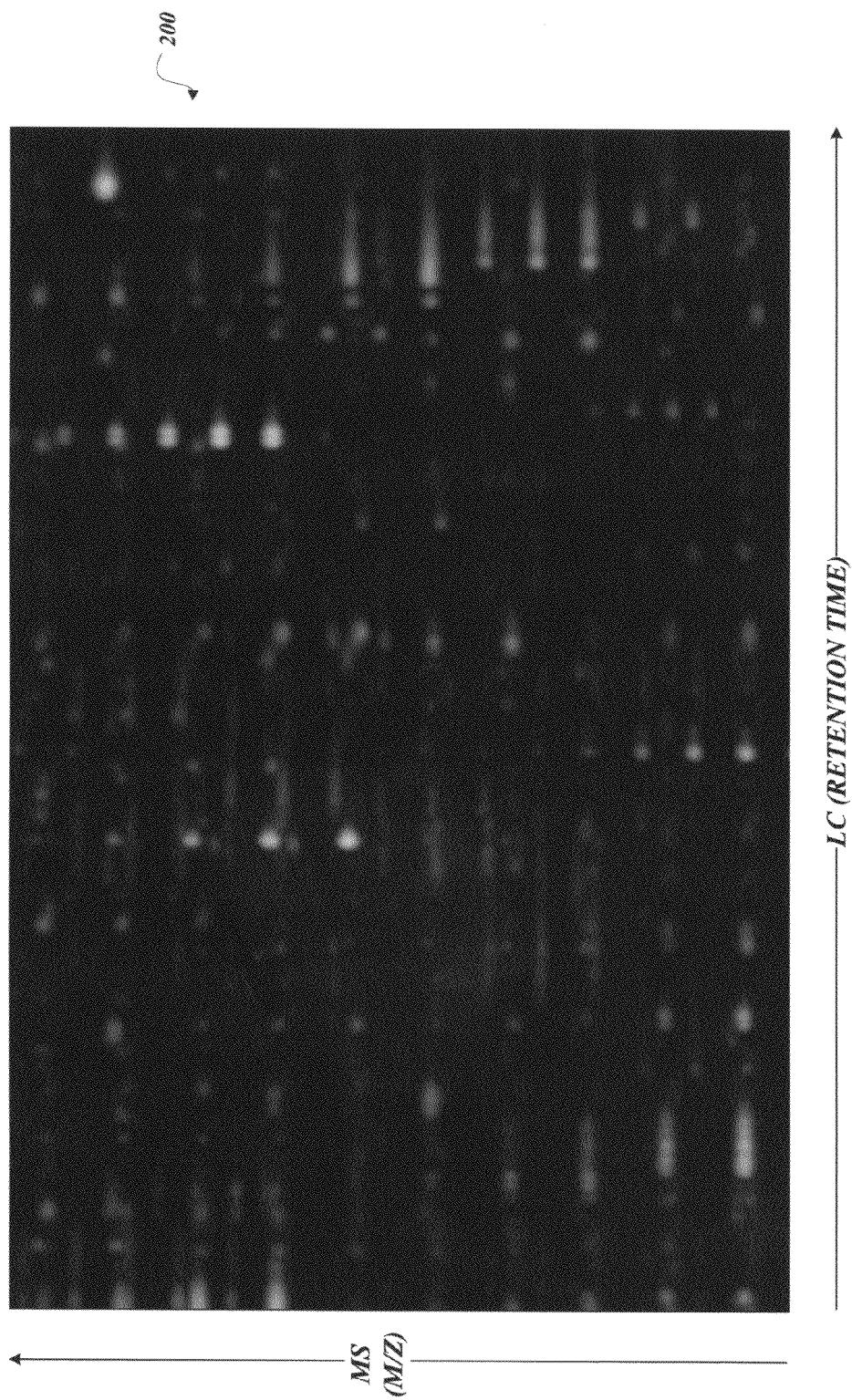
FIG. 2 is a pictorial diagram illustrating an exemplary composite image.

A system 100 in which biological features of interest are discovered using peak reassembly is shown in FIG. 1. Prepared sample 102 is submitted to LC/MS instruments 104. LC/MS instruments 104 allow biological features extracted from the prepared sample 102 to be analyzed in three dimensions (retention time, mass/charge, and intensities). Two dimensions, retention time and mass/charge are separation dimensions. For a given retention time, a one-dimensional continuum can be obtained in the interested mass/charge range. Biological features may be shown as peaks in the continuum, although multiple peaks may simply point to a single biological feature. Each peak has an intensity connected with it and is assumed to be proportional to the relative abundance of non-radioactive, stable isotopes which are associated with biological features. These peaks can be visually observed in one or more replicates 106 produced by the LC/MS instruments 104. The sequentially collected one-dimensional mass-spectra continually form a three-dimensional data set, with retention time being referenced as the x-axis, mass/charge being referenced as the y-axis, and intensities being referenced as the z-axis.

The system 100 includes an aligner 108 that processes multiple replicates 106 to align peaks found in these images. While the aligner 108 may be able to align some peaks, other peaks of the multiple replicates 106 may not be alignable. For example, the attempt to align some non-aligned peaks results in other peaks not being aligned. Thus, the non-aligned peaks may indicate distinct biological features or may indicate non-distinct biological features. The system 100 also includes a replicate merger 110 that produces a composite image 112 used by the system 100 to detect biological features of interest. The composite image 112 contains both aligned peaks as well as non-aligned peaks from multiple replicates.

It is possible that some non-aligned peaks in the composite image, as indicated above, are from the same chemical species, and to avoid or reduce errant analyses, these non-aligned peaks should be reassembled to point to an appropriate biological feature of interest that is indicative of the chemical species. To suitably account for non-aligned peaks, various embodiments first assemble sets of peaks (peaklets) that may constitute a prospective biological feature of interest and that have proximate mass/charge ratio of some tolerance, and second various embodiments reassemble peaklets using a combination of complementation analyses and collision analyses to determine whether distinct peaklets should be reassembled, and, therefore, point to a particular biological feature of interest.

A partitioner 114 partitions the composite image 112 using various suitable techniques for image segmentation, such as thresholding, watershedding, and edge detection. The partitioner 114 thus produces image segments, each segment containing a peaklet, and one or more peaklets may constitute a biological feature of interest when the process of peaklet reassembly is completed by the system 100. From these segments of the composite image 112, a peaklet mask maker 116 produces a mask which outlines various areas, each area containing a peaklet. A peaklet's labeler 118 identifies each area of a mask produced by the peaklet's mask maker 116 using numerical identifiers, textual identifiers, or a combination thereof to establish identities of various areas or segments. Next, a peaklet's center finder 120 determines the center of each peaklet identified by the peaklet's labeler 118 and contained within the areas identified by the peaklet's mask maker 116. In one embodiment, the center of the peaklet is its intensity maximum. Other suitable centers of peaklets can be used.

Tables 122a, 122b visually represent a sorter that sorts centers of peaklets to facilitate reassembly analyses by the system 100. The table 122a includes three columns and six rows. The first row contains the nomenclatures of various columns, such as "PEAKLET LABEL," and cells of this column contain identifiers of various areas of peaklets as labeled by the peaklet's labeler 118; "M/Z OF MAX," of which cells of this column contain pixel locations of the mass/charge axis where the center of the various peaklets can be found; and "RT OF MAX," of which cells contain pixel locations in the retention time axis that further identify the center of various peaklets. The table 122b has been sorted by the sorter so that adjacent peaklets represented by various rows locate in proximity to one another. A peaklet's grouper 124 groups various peaklets that have a proximate mass/charge ratio. A peaklet's assembler 126 assembles peaklets that have a likelihood of belonging to a biological feature of interest. An assembled peaklets mask creator 128 produces a mask by thresholding a fraction of the peaklet center to locate the unassembled peaklets, as well as assembled peaklets. The system 100 includes a peaks reassembler 130 that provides finer analysis on whether the peaklets should be reassembled to point to a biological feature of interest or whether the peaklets should remain distinct to point to distinct biological features of interest.

A composite image 200 is formed from multiple replicates by the replicate merger 110. The y-axis describes the mass/charge dimension and the x-axis describes the retention time dimension. The composite image 200 shows various gray-level visual objects, whose whiter pixels indicate higher intensities. Areas that are whiter than their surroundings may indicate peaks that have been aligned or non-aligned by the aligner 108. Some non-aligned peaks may belong to various biological features of interest, but because of variations in the chromatography process or changes in the sequence of eluting chemical species, they appear to be distinct. Various embodiments execute a peaks reassembly process to determine whether peaks point to various biological features of interest.

Figure 3:
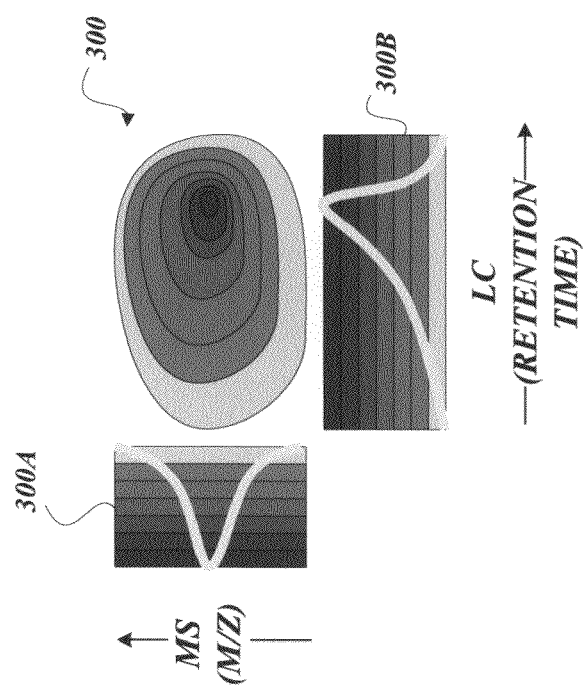
FIG. 3 is a pictorial diagram illustrating the elevations or inequalities of an exemplary peak.

One of the peaks from the composite image 200 is abstracted as a relief diagram 300 showing elevations of a peak from its base to its local maximum. See FIG. 3. In addition to the y-axis that describes the mass/charge dimension, an illustration 300a shows the elevations of the intensity in the z-axis slicing through a particular retention time whereas an illustration 300b shows various elevations connected with pixel intensities sliced through a particular mass/charge range. The peaks represented by the relief diagram 300 result from a chemical species eluting over a period of time as detected by the LC/MS instruments 104. Each chemical species produces ion counts that are typically distributed around a characteristic's mass/charge range.

FIGS. 4A and 4B illustrate two different replicates 402, 404 produced by the LC/MS instruments 104 from submitted prepared samples 102. The replicate 402 contains a number of peaks illustrated as unfilled ovals. Similarly, the replicate 404 contains a number of peaks illustrated as filled ovals. An aligned image 406 is a result of overlaying the replicate 402 with the replicate 404 using suitable time alignment techniques. The aligned image 406 shows that some unfilled ovals are now co-located with certain filled ovals, indicating their alignment. However, as shown by the aligned image 406, there are three filled ovals, which do not co-locate with three other unfilled ovals even though they seem to have a proximate mass/charge range and different retention time range. These ovals constitute non-aligned peaks. As would be appreciated by one skilled in the art, if the non-aligned ovals are forced to be aligned, the aligned image 406 will show that other aligned peaks are now no longer in alignment.

FIGS. 5A-5F illustrate various instances of the composite image 112 by the system 100. The composite image 112 is represented in abstracted detail by a composite image 502. See FIG. 5A. The composite image 502 is illustrated in relief showing elevation of various peaks detected by the LC/MS instruments 104. FIG. 5B illustrates a partitioned composite image 504 which has undergone various peak detection techniques to produce multiple image segments containing peaklets. A peaklets mask 506 is shown in FIG. 5C and is essentially a thresholding of the partitioned composite image 504 revealing distinct areas containing various peaklets. FIG. 5D illustrates a threshold mask 508 of peaklets so as to aid in identifying their centers for subsequent analysis. An image 510, as shown in FIG. 5E, contains a number of crosshairs used as a reference for marking the centers of various peaklets. As discussed before, the center of a peaklet may be identified from its local maximum. In other words, the crosshairs identify locations of peaklets where the most intense maxima can be found. FIG. 5F illustrates an image 512 that shows the labeling of various peaklets as well as their reassembly. For example, peaklets 1, 3, and 5 have been reassembled in accordance with various embodiments because, notwithstanding the fact that these peaklets are visually distinct, they actually all point to one biological feature of interest.

Figure 6A:
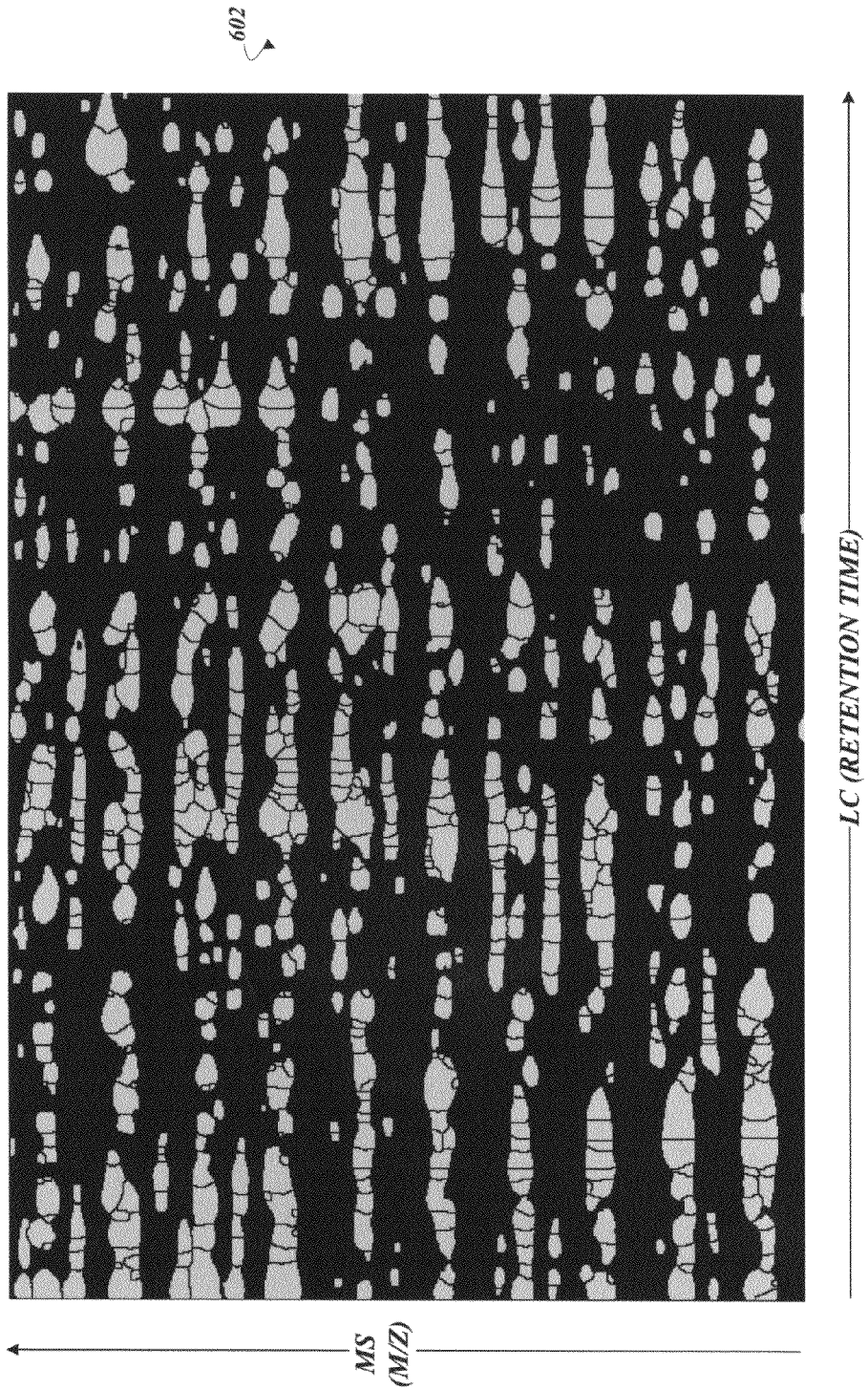
FIG. 6A is a pictorial diagram of an exemplary partitioned composite image and FIG. 6B is a pictorial diagram of an exemplary reassembled composite image.
Figure 6B:
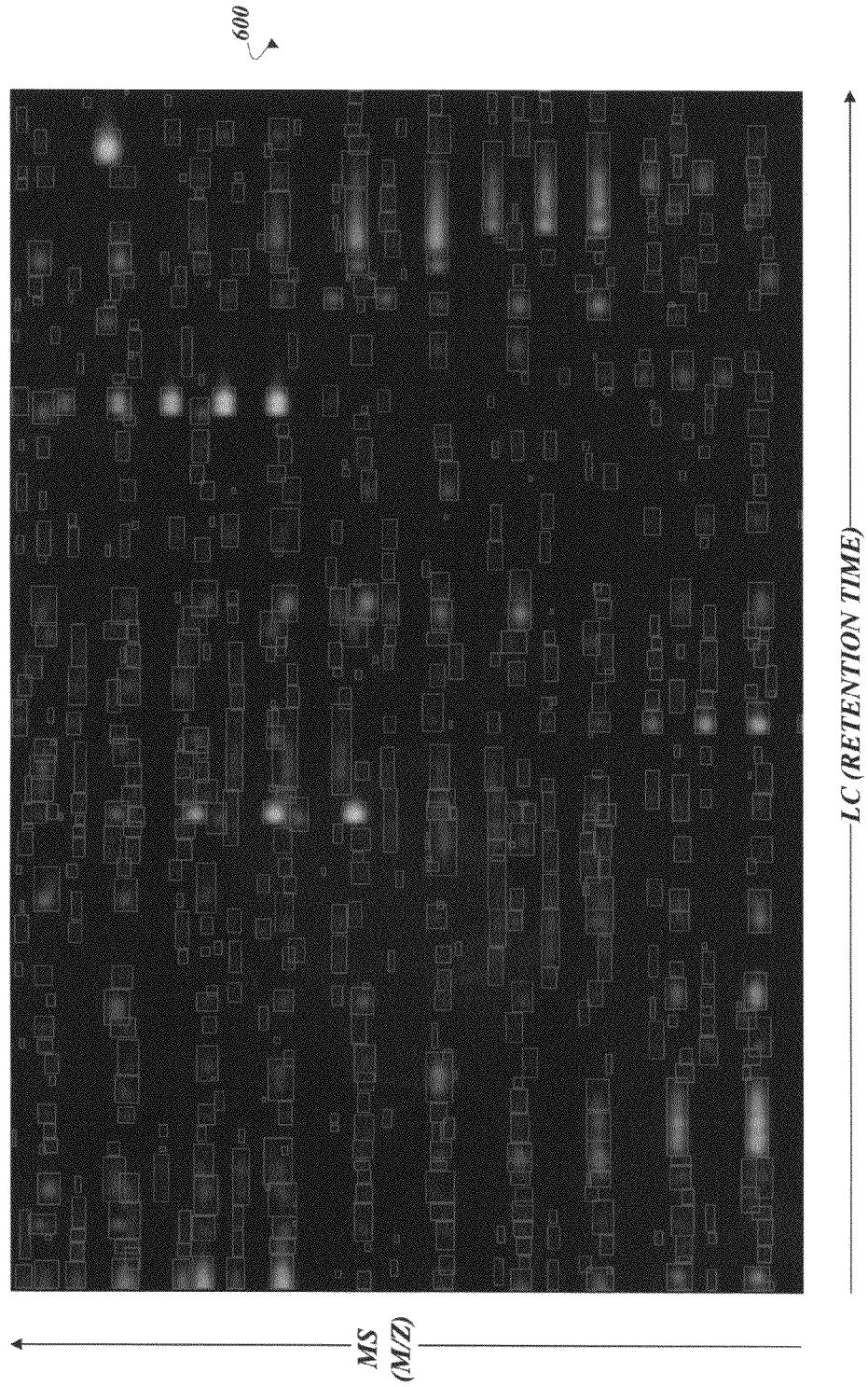

FIG. 6A illustrates a partitioned composite image 602 in greater detail. Various polygons can be seen to envelop gray-level visual objects of the composite image 200. These partitions help to localize areas of analysis to help focus the reassembly process via use of complementation calculation and collision calculation. FIG. 6B illustrates a reassembled composite image 600 in which certain peaks have been reassembled by the system 100. A number of rectangular shapes contain a number of gray-level visual objects, which are reassembled peaks, assisted by the partitioned composite image 602. The reassembled composite image 600 does show rectangles that contain only individual peaks, indicating that they were not reassembled. These rectangular shapes indicate regions containing peaklets that are reassembled or not reassembled using collision and complementation analyses.

FIG. 7A illustrates a table of three columns and six rows, in which each column is indicative of a field of data identifying the cells below the first row such as "PEAKLET LABEL," "M/Z OF MAX," and "RT OF MAX." Each row below the first row is indicative of a peaklet identified after the segmentation process executed by the system 100. For example, the second row indicates a label "4" that identifies a particular peaklet whose center is at the m/z pixel (4) and the rt pixel (7). The third row includes a peaklet with a label "2" whose center is at the m/z pixel (6) and the rt pixel (4). The fourth row describes a peaklet with a label "1" whose center is at the m/z pixel (10) and the rt pixel (3). The fifth row contains the peaklet labeled "3" whose center is at the M/Z pixel (9) and the rt pixel (6). The last row describes the peaklet labeled "5" whose center is at the M/Z pixel (8) and the rt pixel (9). After the process of assembly, some rows of the table 702 share the same color to indicate that they can be assembled together as a prospective biological feature of interest while other rows do not share colors and therefore are unlikely to be part of an assemblage. A pictorial diagram 704 shows not only the peaklets in different elevations but also peaklets that share the same color corresponding to the rows of the table 702. See FIG. 7B. The pictorial diagram 704 visually presents those peaklets that are part of an assemblage at the conclusion of the assembly process executed by the system 100. There are two rows of the table 702 that have colors different from one another as well as from the sole assemblage, and these colors are repeated again at the pictorial diagram 704 to show that these peaklets are not part of any assemblage.

Figure 8A:
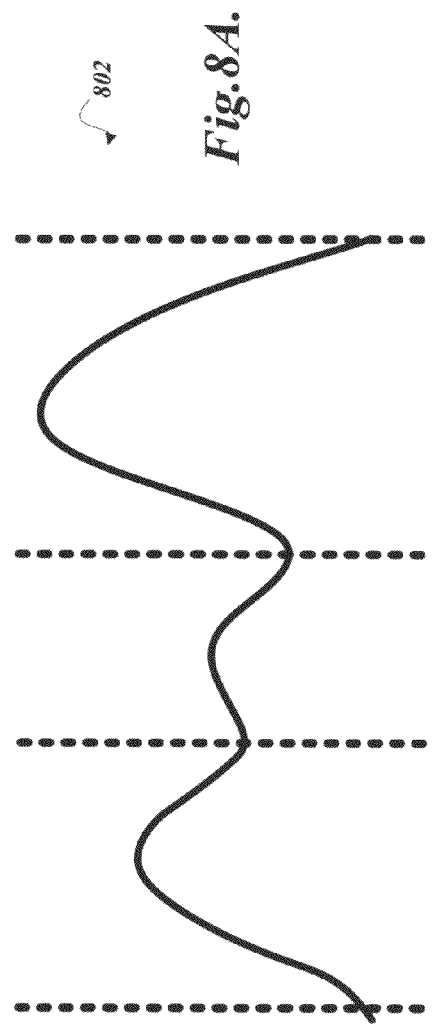
FIG. 8A is a pictorial diagram of exemplary adjacent peaklets taken from a composite image.

FIG. 8A illustrates an envelope 802 that plots peaklet intensities against the retention time dimension sliced across a center m/z range. A number of dashed vertical bars indicate the boundaries between adjacent peaklets that are members of an assemblage. The envelope 802 illustrates the assemblage of peaklets in its abstract form before the reassembly process is executed. After the reassembly process is executed, some of the vertical-dashed bars may be removed to indicate that one or more peaklets have been reassembled in the reassembly process so as to indicate that those peaklets together point to a particular biological feature of interest. The envelope 802 shows there are three peaklets, each peaklet having a local maximum.

Figure 8B:
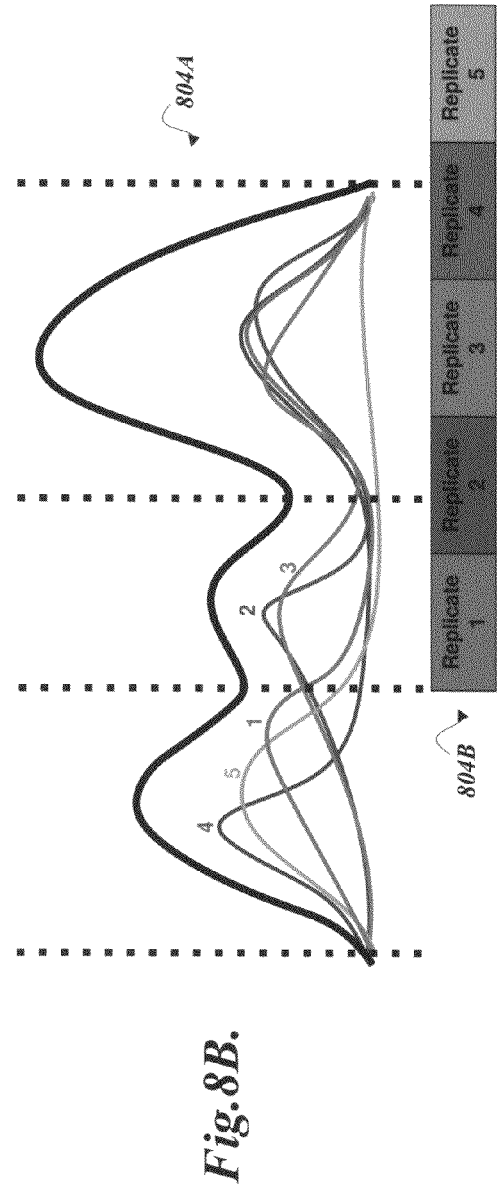
FIG. 8B is pictorial diagram illustrating exemplary adjacent peaklets and various wave forms representing exemplary replicates.

Various embodiments provide a fine granular analysis to ascertain the makeup of these local maxima to extract knowledge about whether adjacent peaklets can be reassembled because there is a likelihood that the adjacent peaklets point to a biological feature of interest or should remain distinct because the adjacent peaklets indicate distinct biological features of interest. FIG. 8B presents another envelope 804a which is similar to the envelope 802 of FIG. 8A, but underneath each peaklet's envelope, a number of other curves are shown, such as curves 1-5. Each of these curves represent intensity plots taken from various replicates forming the areas of the composite image where the envelopes 802, 804a were taken.

A table 804b visually indicates there are five replicates that were used to produce the areas of the composite image from which the envelope 804a was derived. Each of the curves 1-5 can be viewed as a chromatogram containing the intensities of eluted ions over a period of retention times. As illustrated in more detail, various peaklets are derived from multiple maxima of various replicates. These pieces of information are used to calculate collision strength as well as complementation strength to aid in the reassembly process.

Figure 8C:
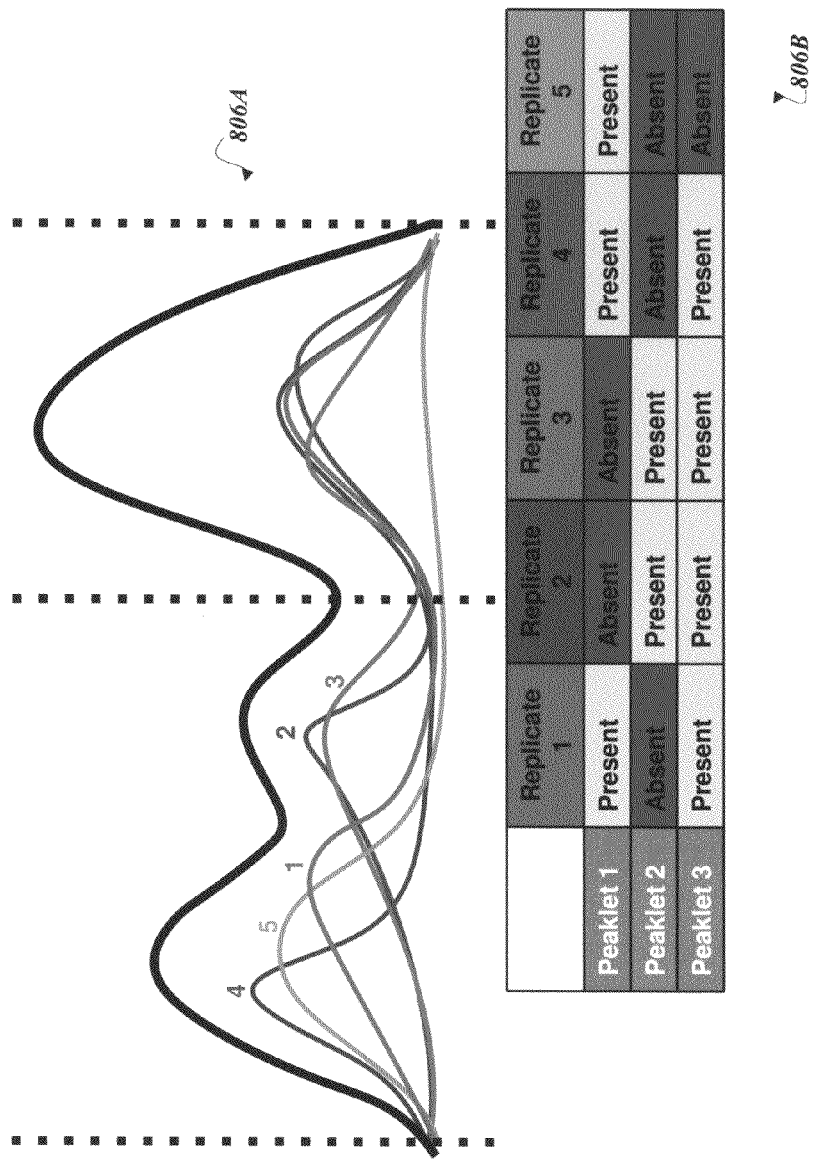
FIG. 8C is another pictorial diagram illustrating exemplary adjacent peaklets, various chromatograms representing exemplary replicates, and a table indicating the presence or the absence of local maxima of various replicates.

FIG. 8C repeats the graph of FIG. 8B now referenced as envelope 806a, but because two of the adjacent peaklets have been reassembled as determined by the system 100, the vertical-dashed bar between them has been removed. A table 806b presents evidence that indicates the reasons certain adjacent peaklets can be reassembled pointing to a biological feature of interest. The table 806b includes six columns and four rows. The first column contains the nomenclatures of various peaklets such as "Peaklet 1," "Peaklet 2," and "Peaklet 3." The first row contains the nomenclatures of various replicates such as "Replicate 1," "Replicate 2," "Replicate 3," "Replicate 4," and "Replicate 5."

Peaklet 1 and Peaklet 2 were found by the system 100 to be in condition for reassembly. The cells of the row "Peaklet 1" indicate that there are local maxima at Replicate 1, Replicate 4, and Replicate 5, and the absence of local maxima at Replicate 2 and Replicate 3. In contrast, the row "Peaklet 2" contains cells that indicate the absence of local maxima at Replicate 1, Replicate 4, and Replicate 5, and the presence of local maxima at Replicate 2 and Replicate 3. Because of the complementation between Peaklets 1, 2, they can be reassembled. In other words, wherever there is an absence of a local maximum in one peaklet, and there is the presence of the local maximum in an adjacent peaklet, complementation is present. In contrast, Peaklet 3 was not found to be in condition for reassembly with Peaklet 2 because, as one example, both Peaklet 2 and Peaklet 3 contain maxima in Replicate 2 and Replicate 3. In addition, because Replicate 2 contains both Peaklet 2 and Peaklet 3, there is a collision. Moreover, because Replicate 3 contains both Peaklet 2 and Peaklet 3, there is yet another collision. Hence, Peaklet 3 is not in condition for reassembly with Peaklet 2.

Figure 9A:
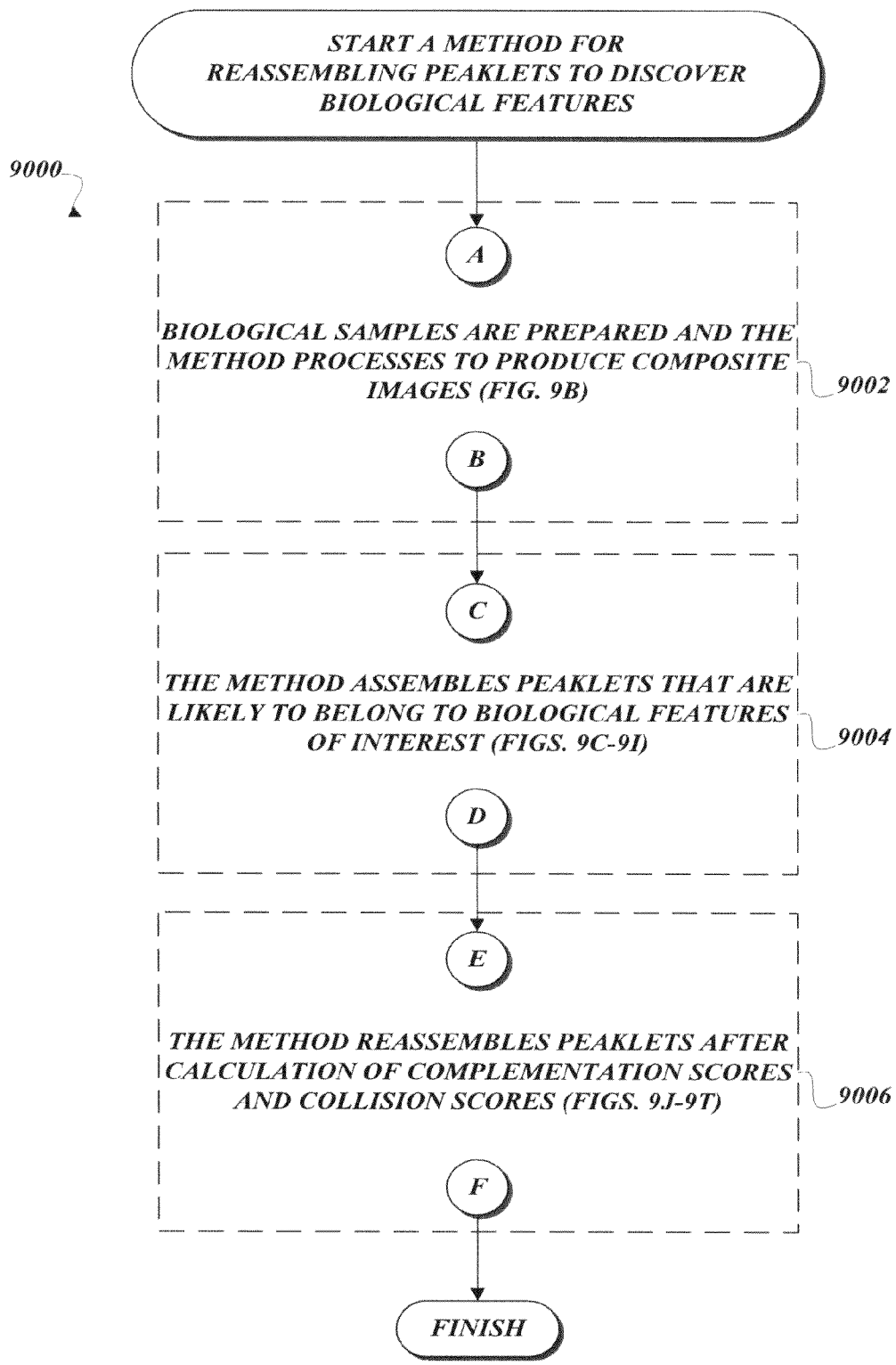
FIGS. 9A-9T are process diagrams illustrating an exemplary method for reassembling peaklets to discover biological features.
Figure 9B:
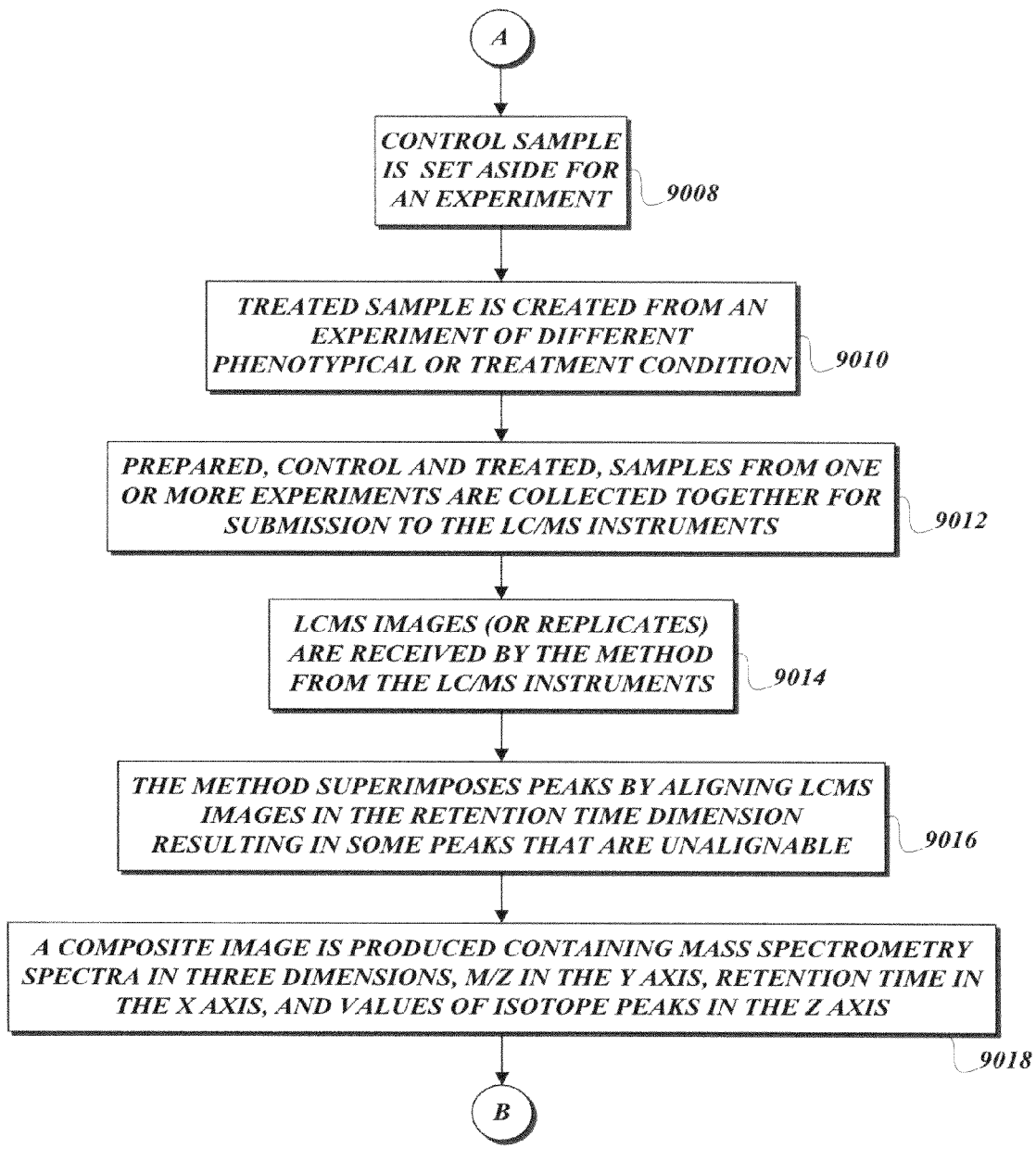
Figure 9C:
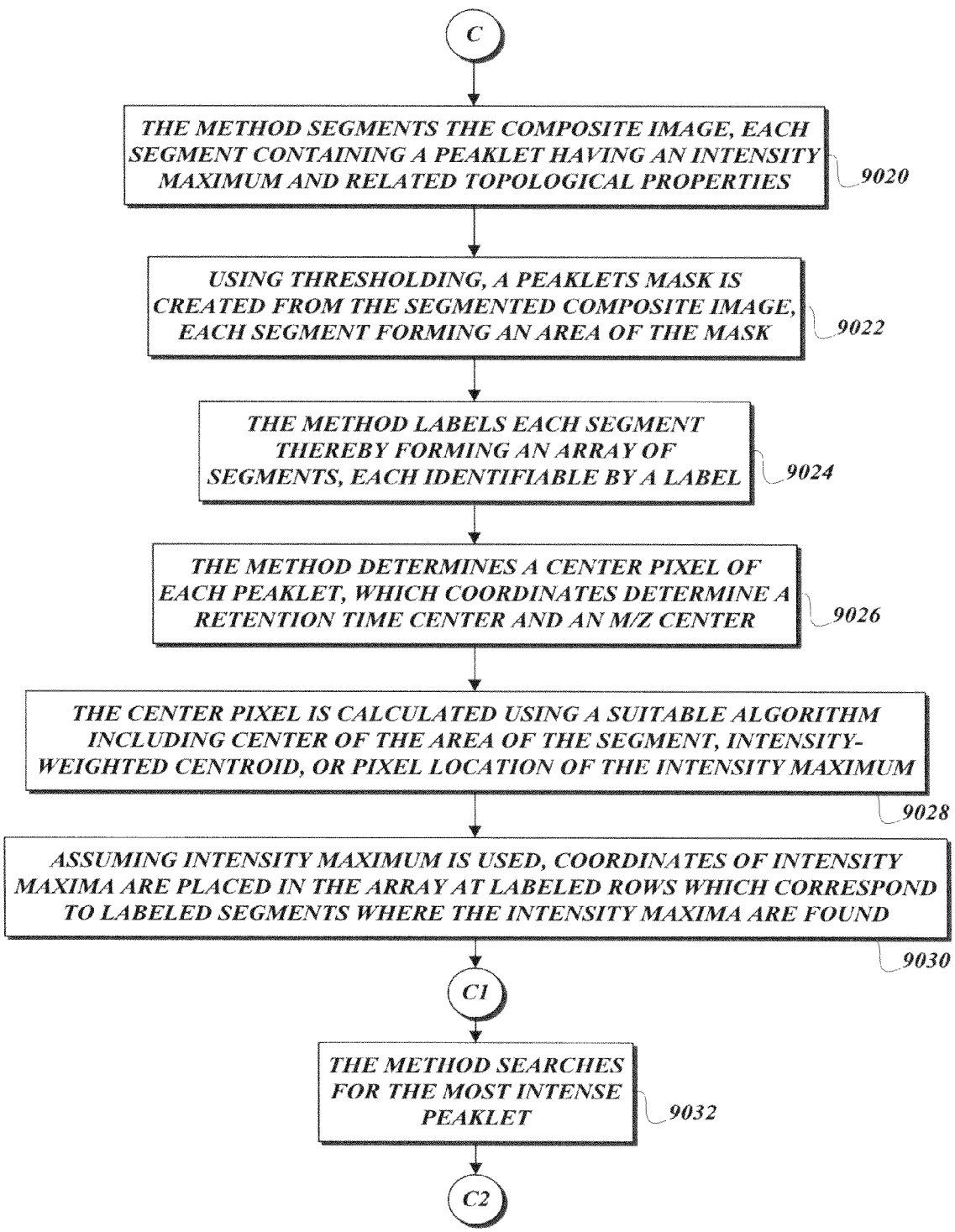
Figure 9D:
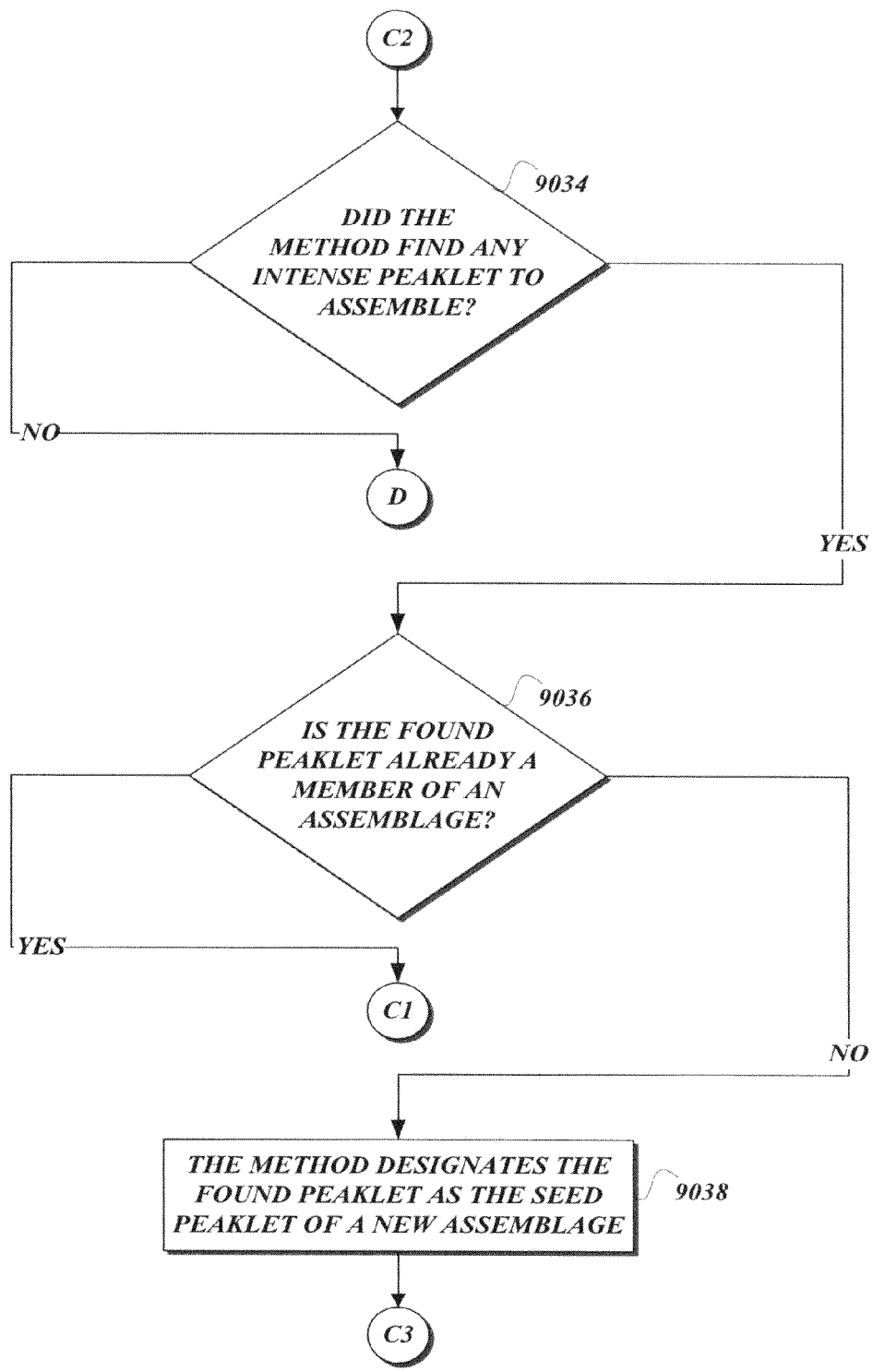
Figure 9E:
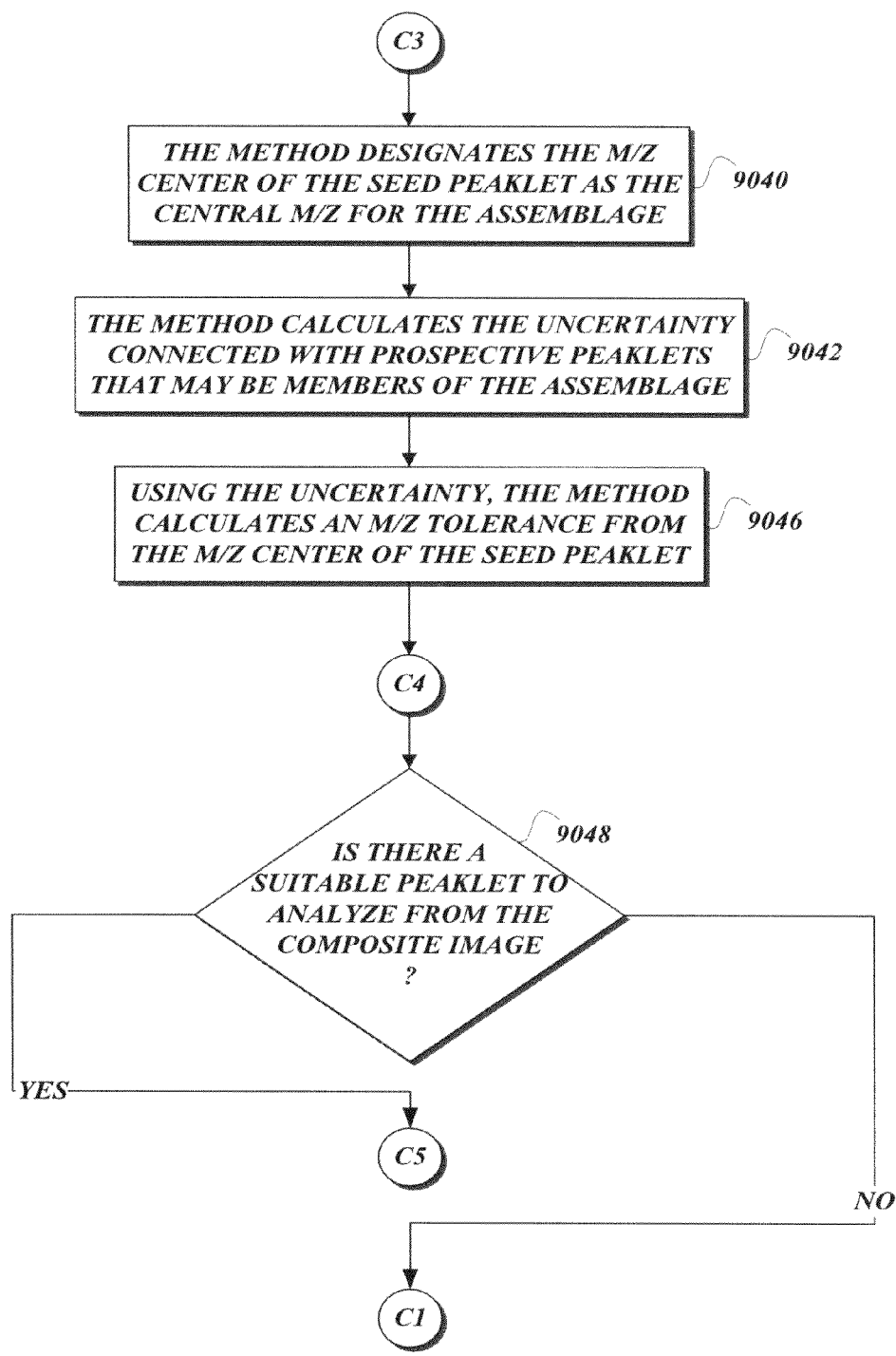
Figure 9F:
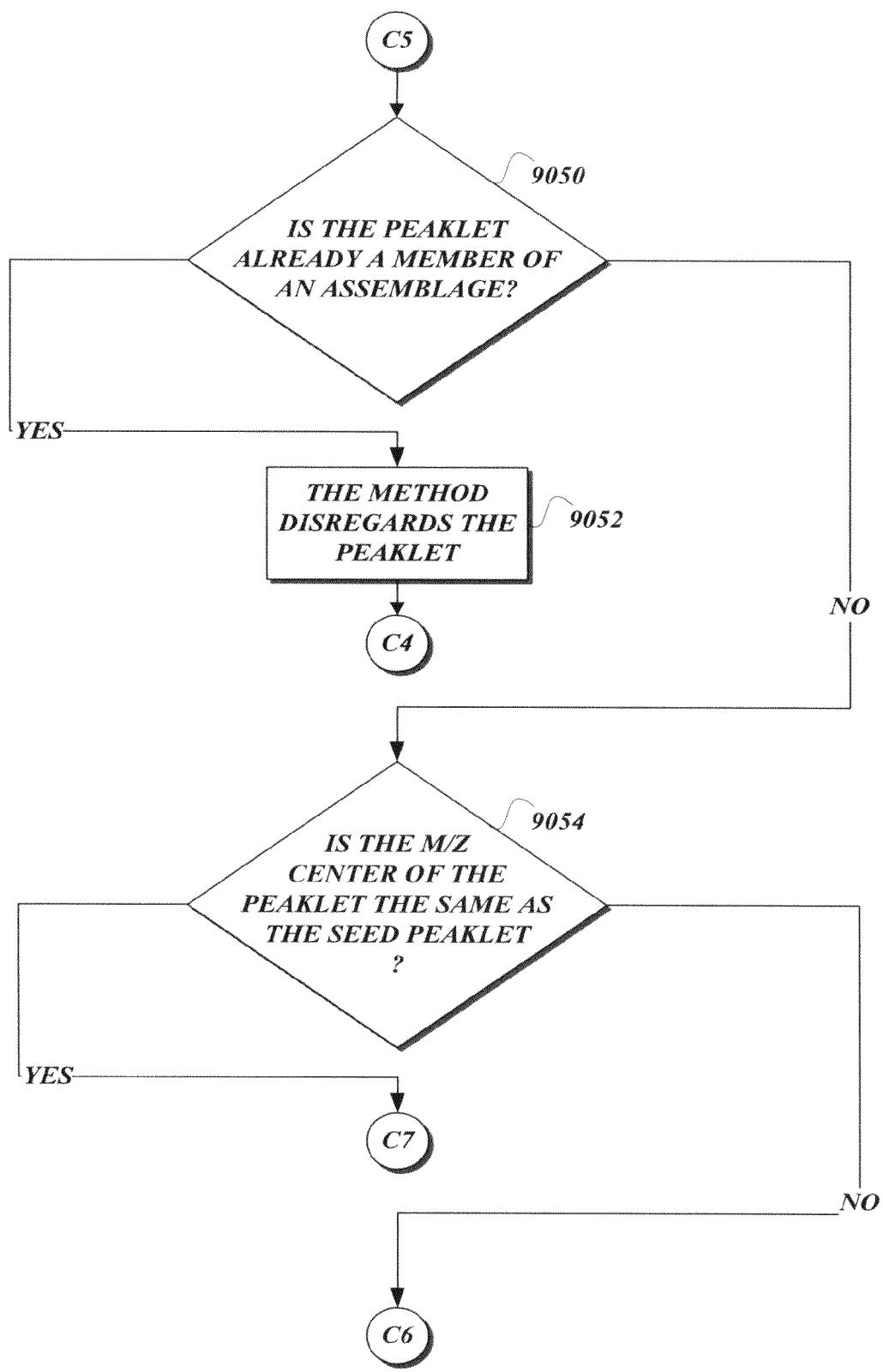
Figure 9G:
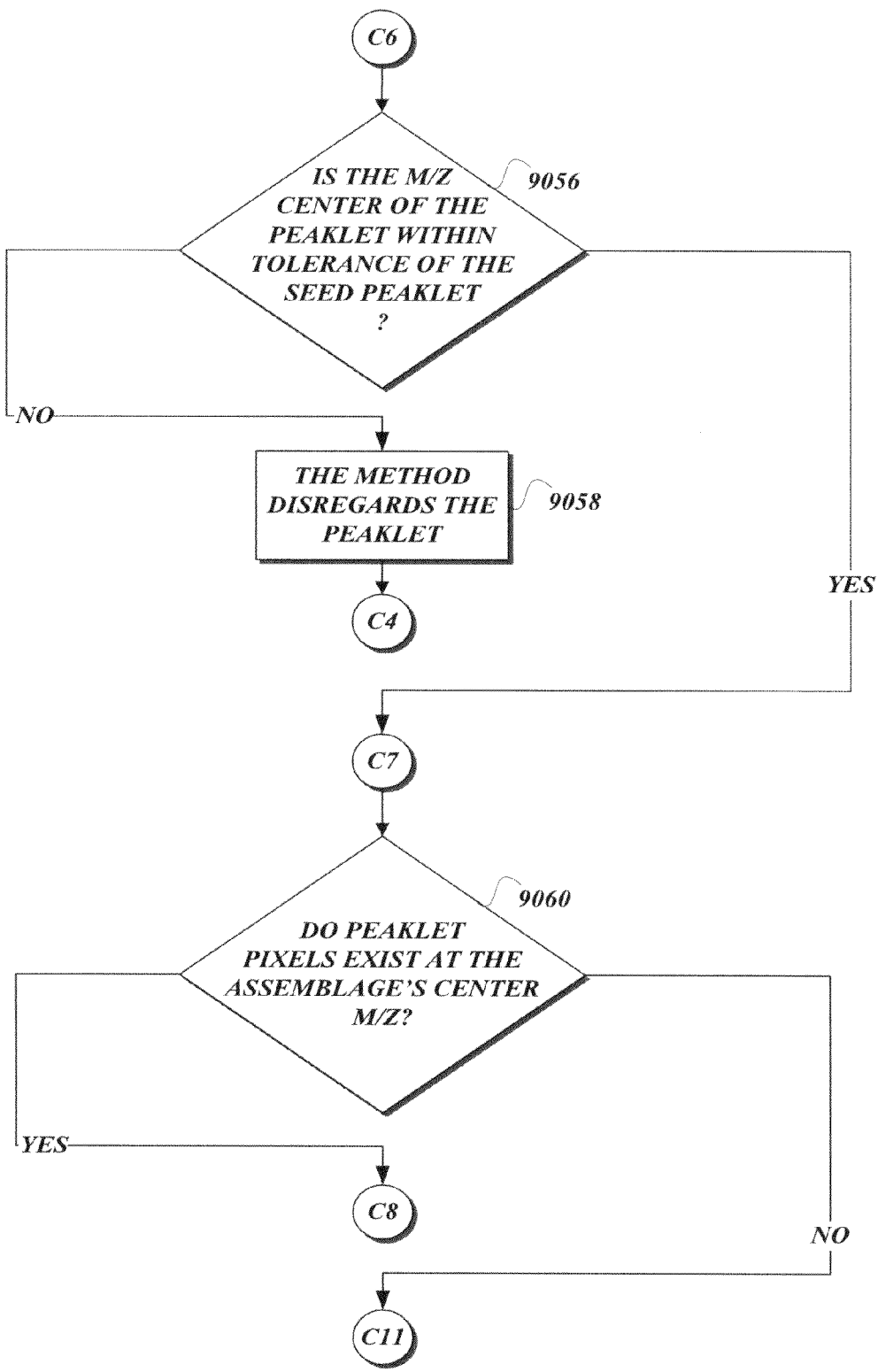
Figure 9H:
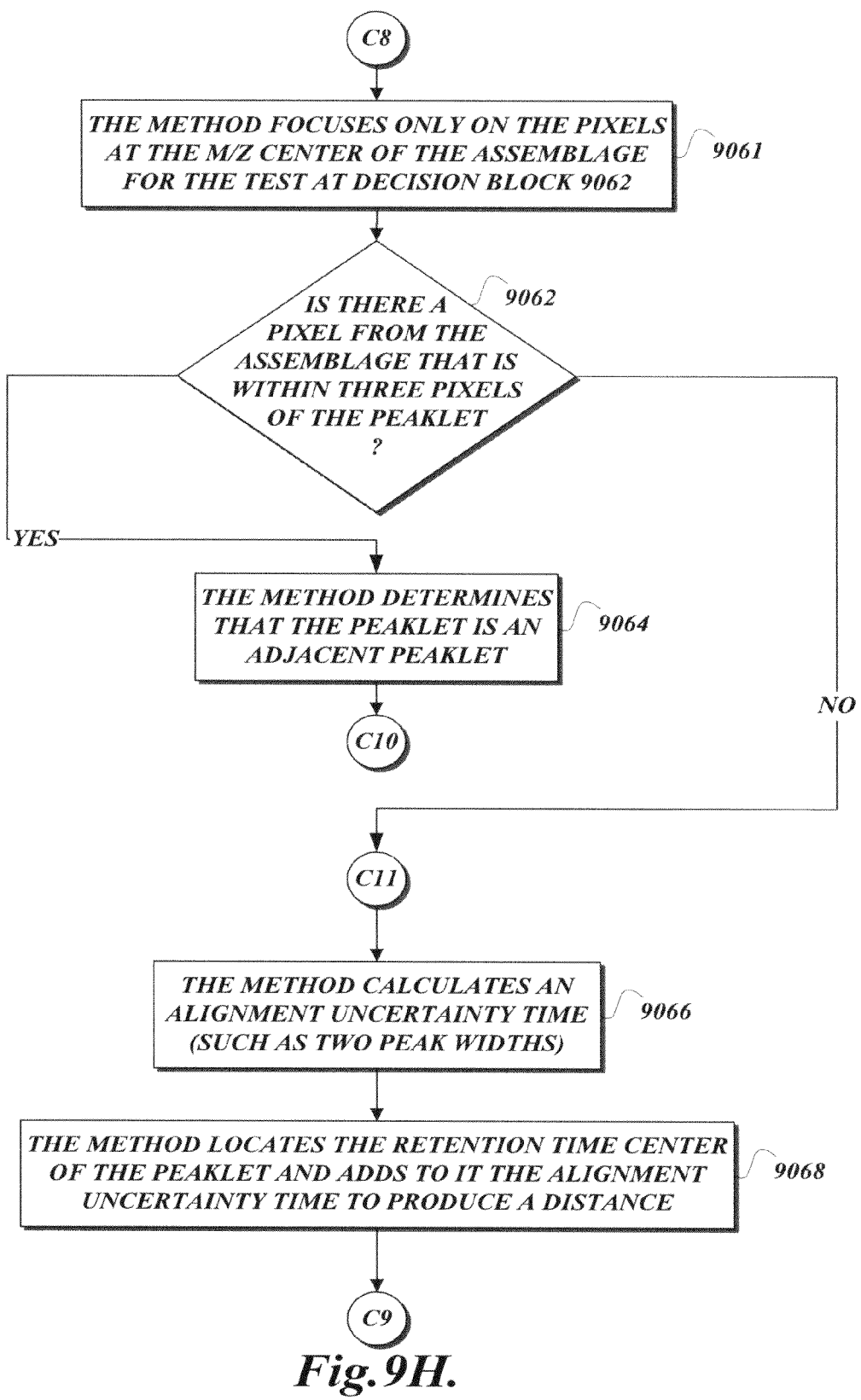
Figure 9I:
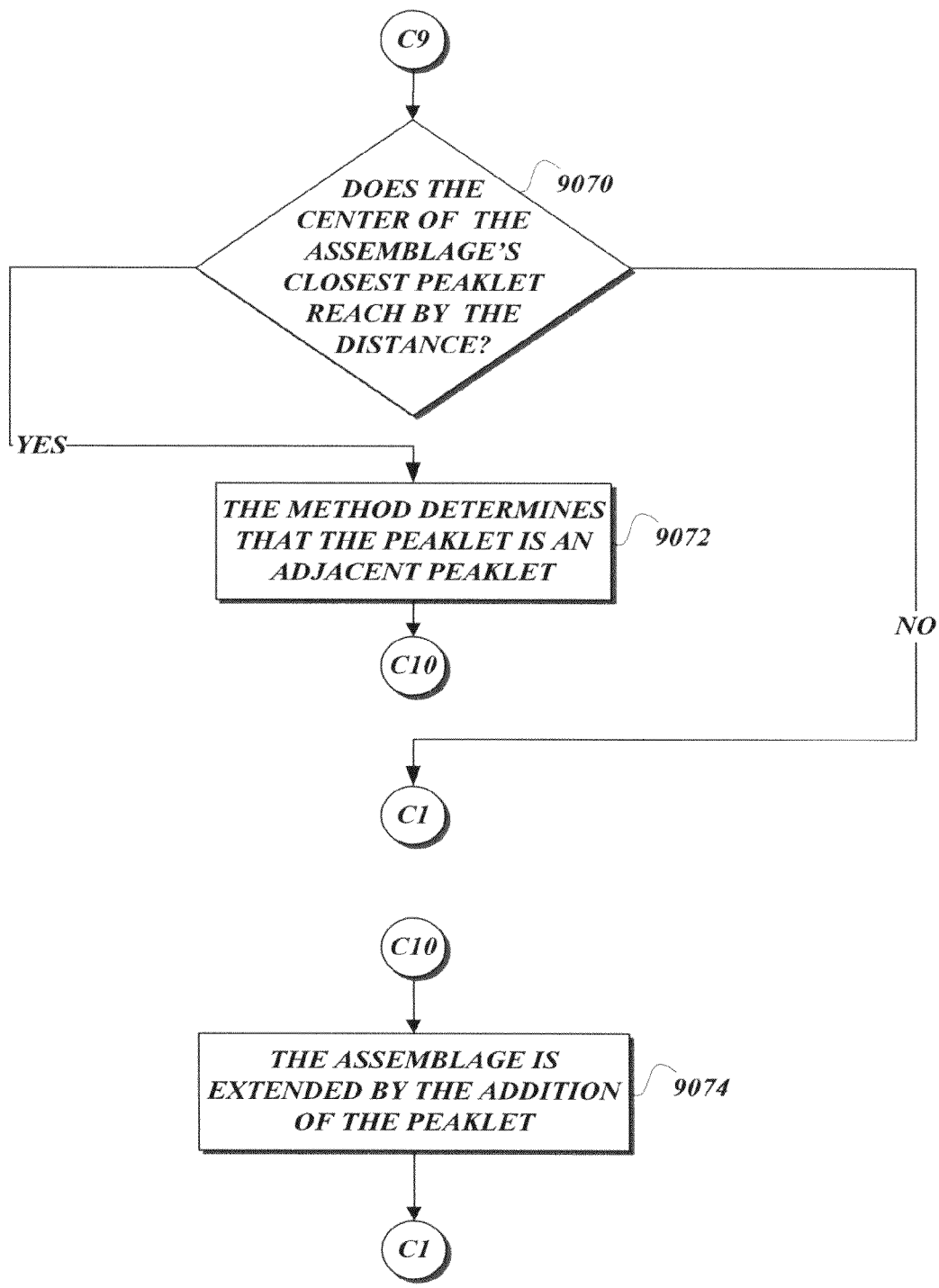
Figure 9J:
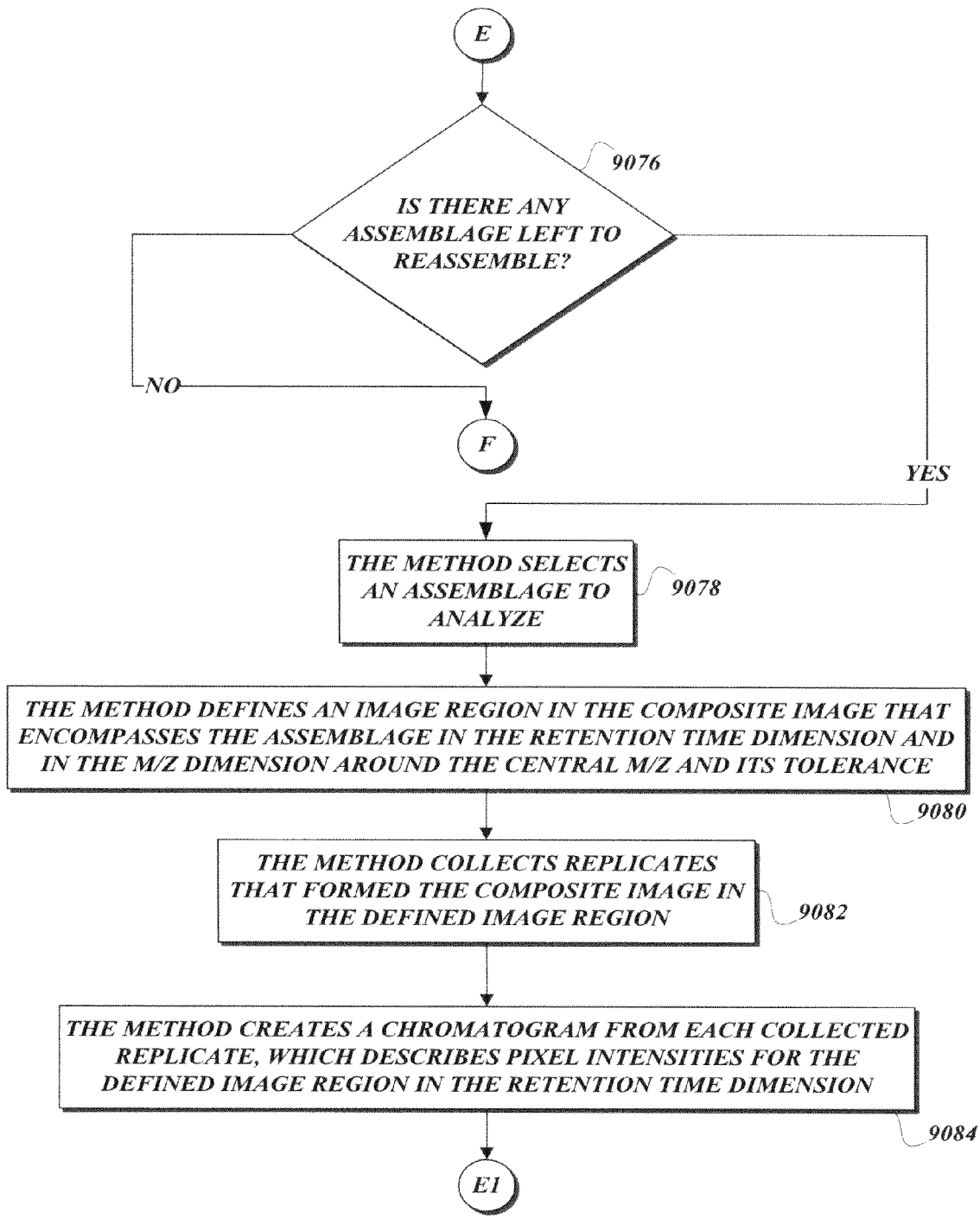
Figure 9K:
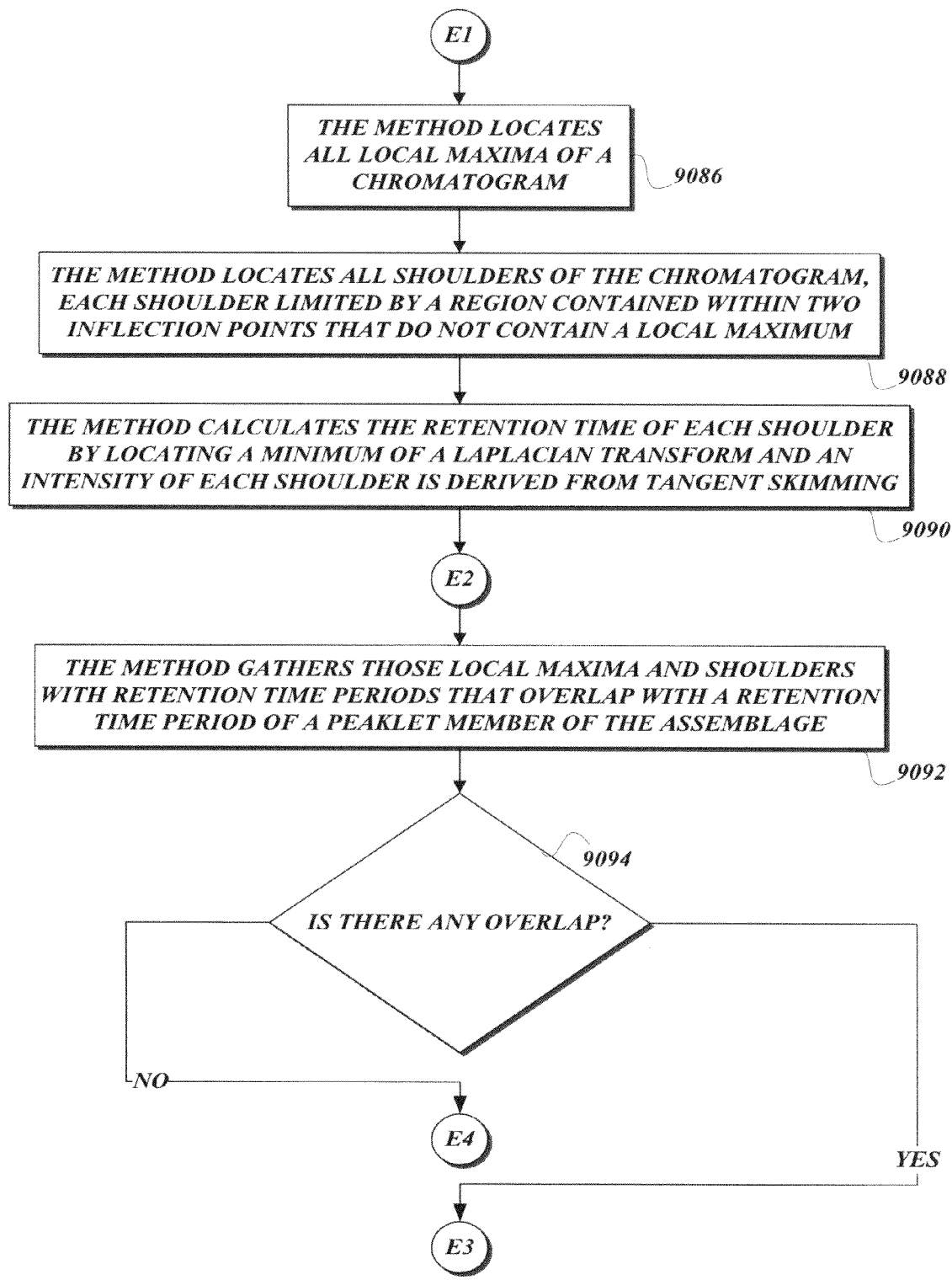
Figure 9L:
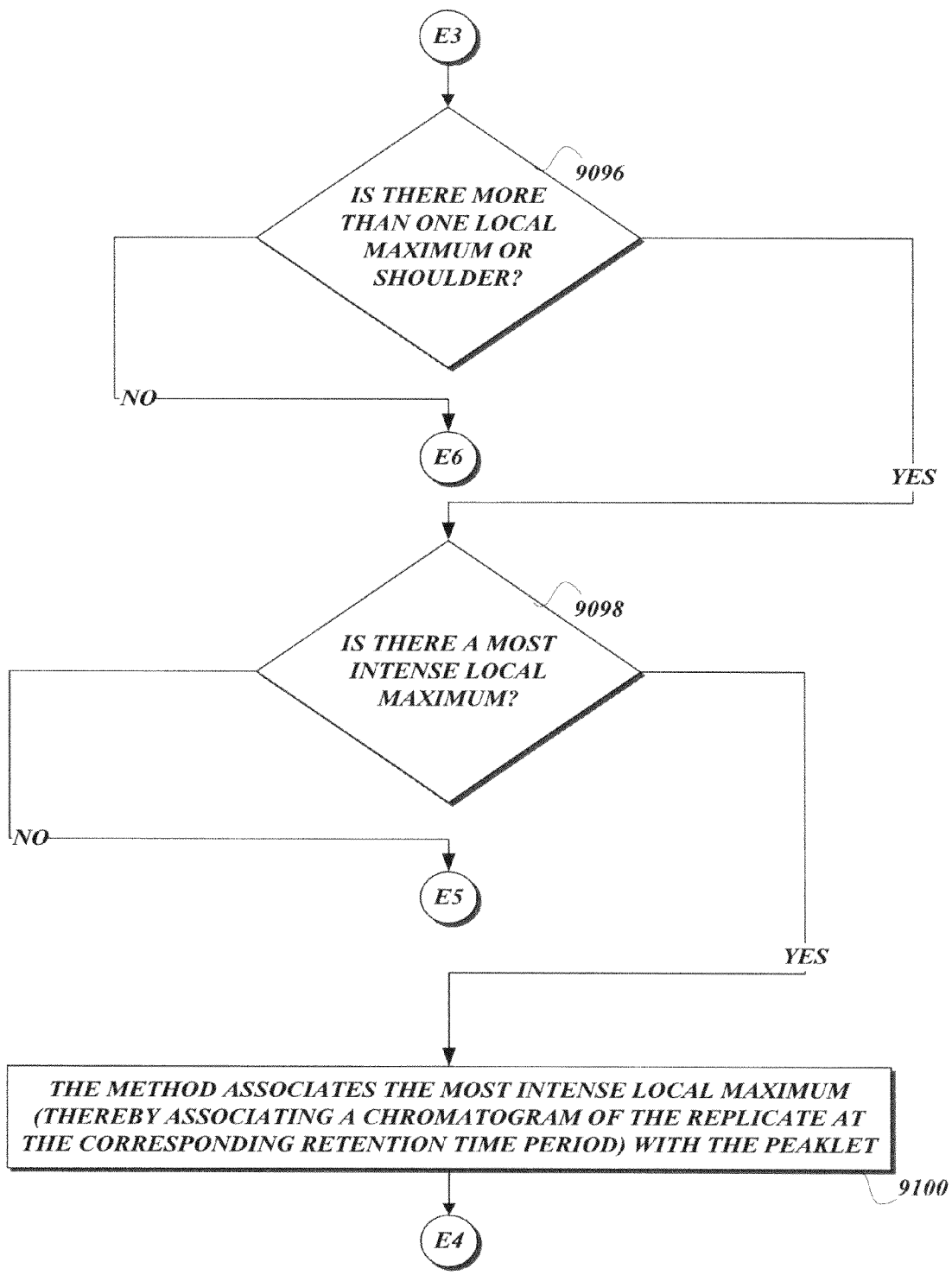
Figure 9M:
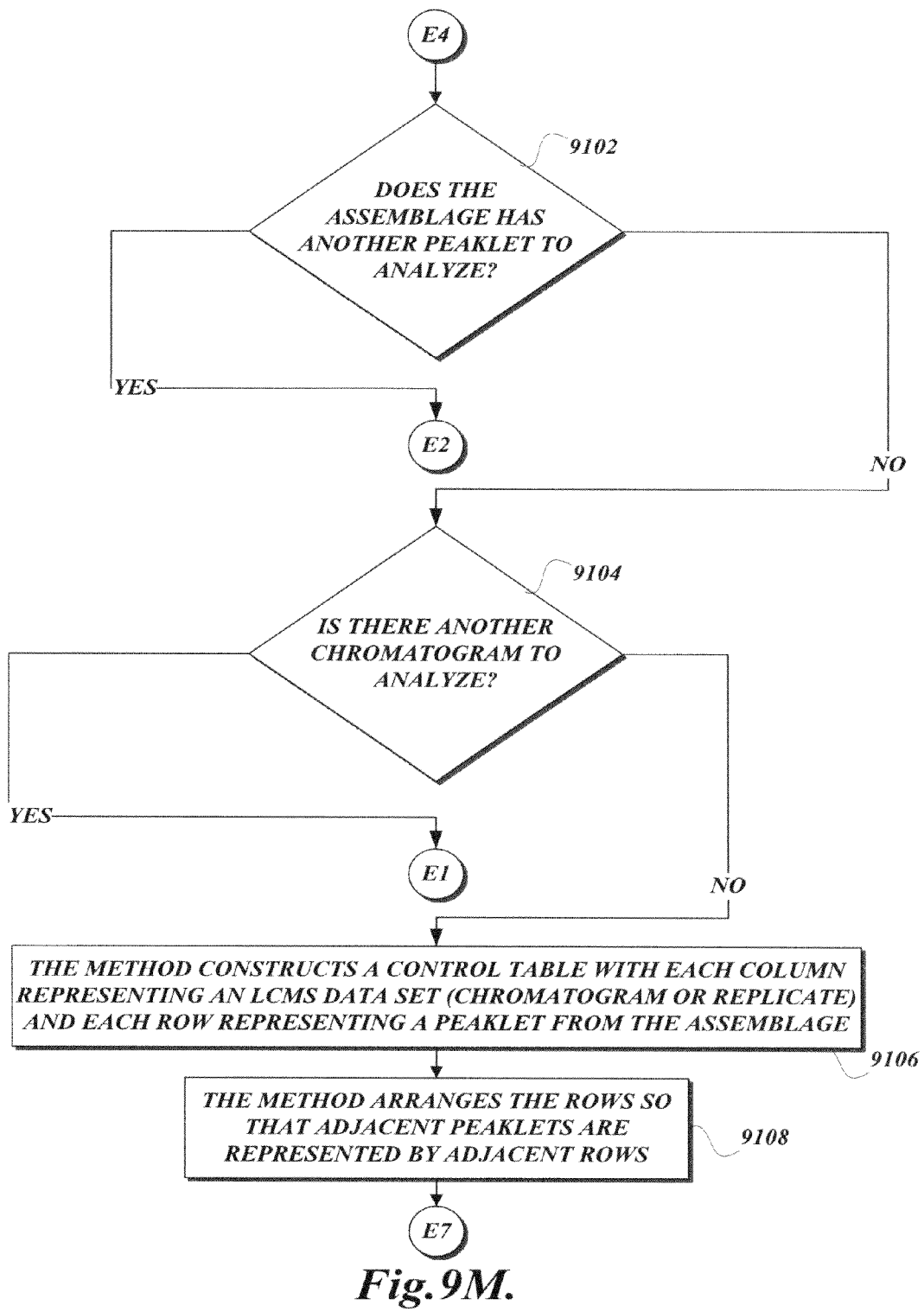
Figure 9N:
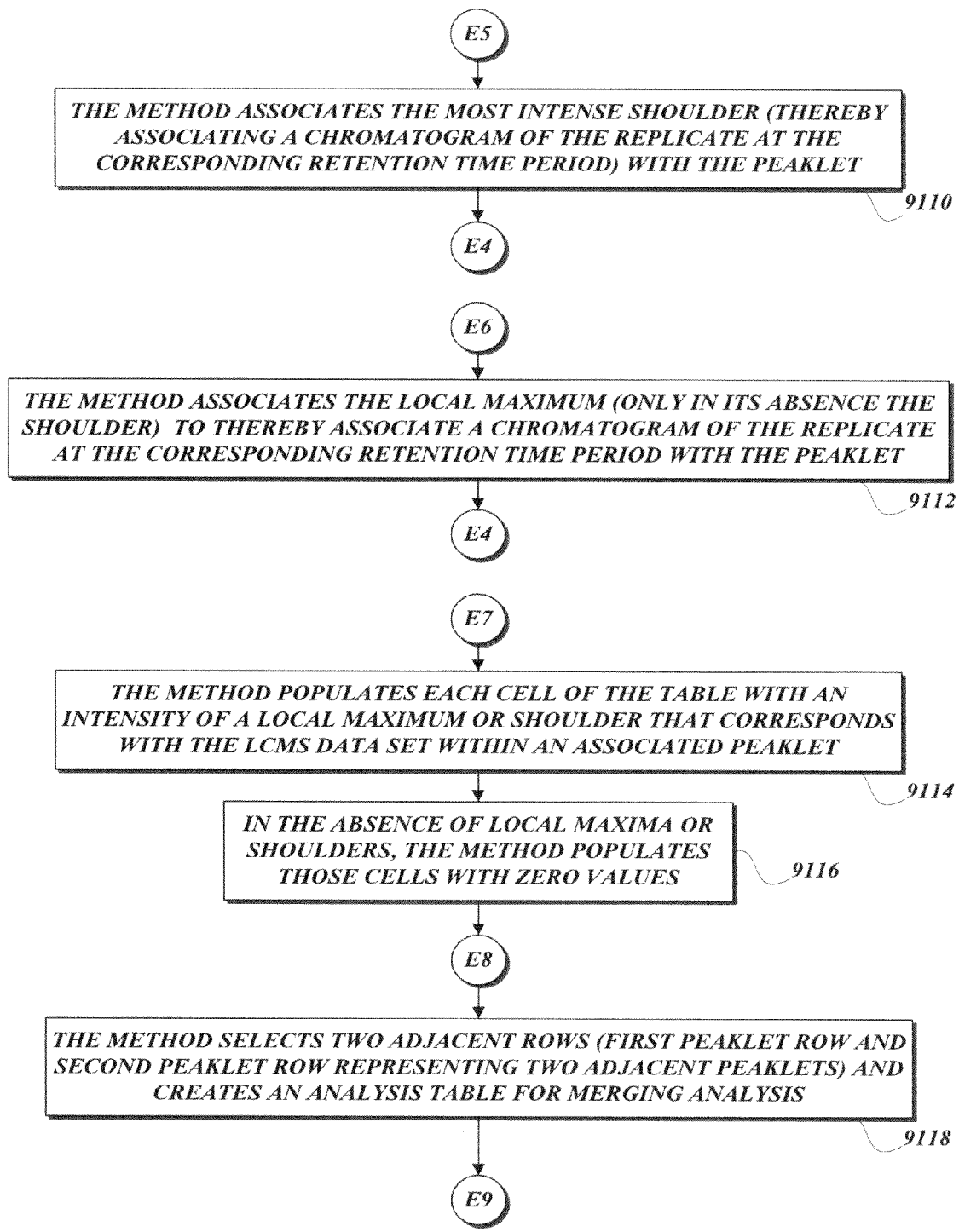
Figure 9O:
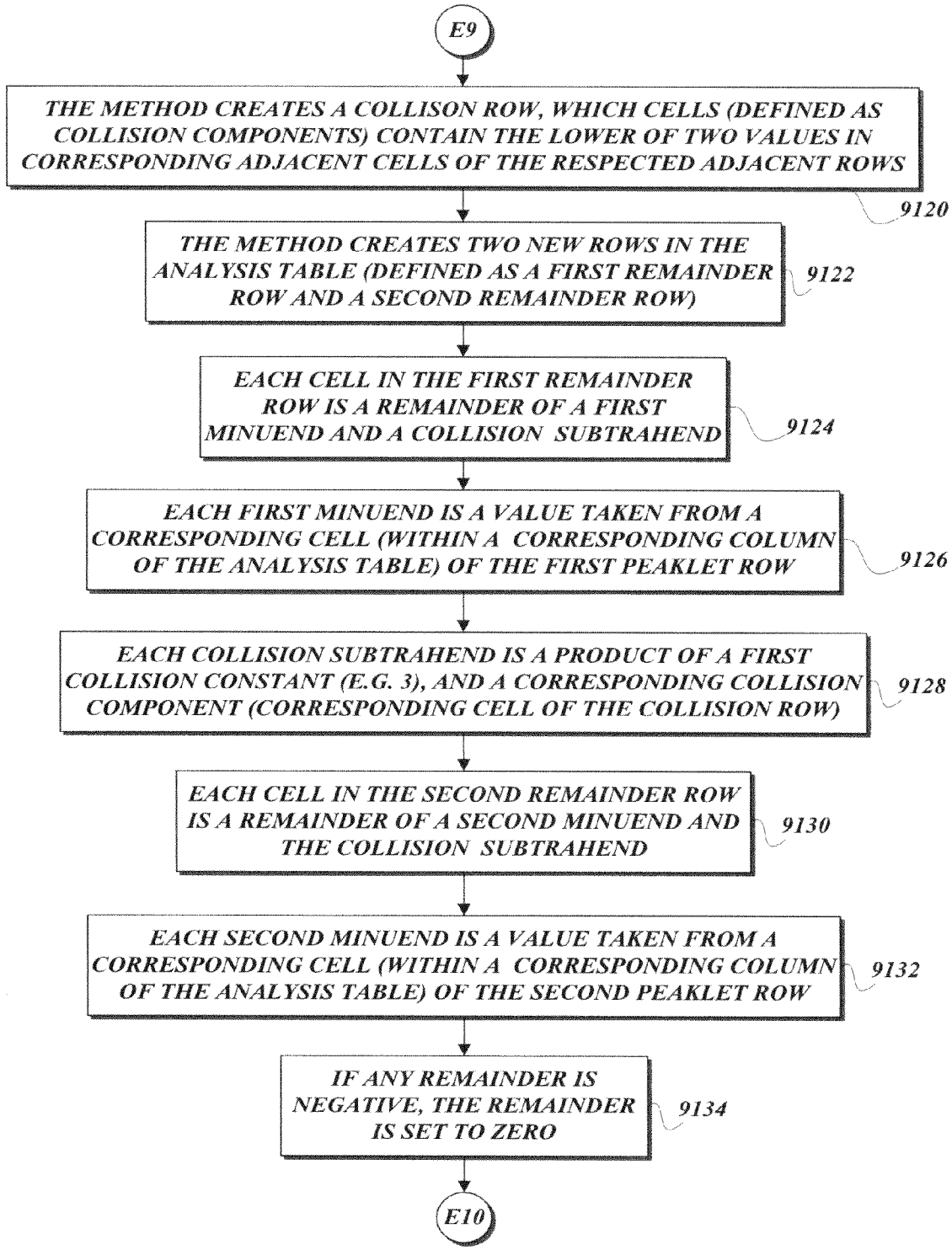
Figure 9P:
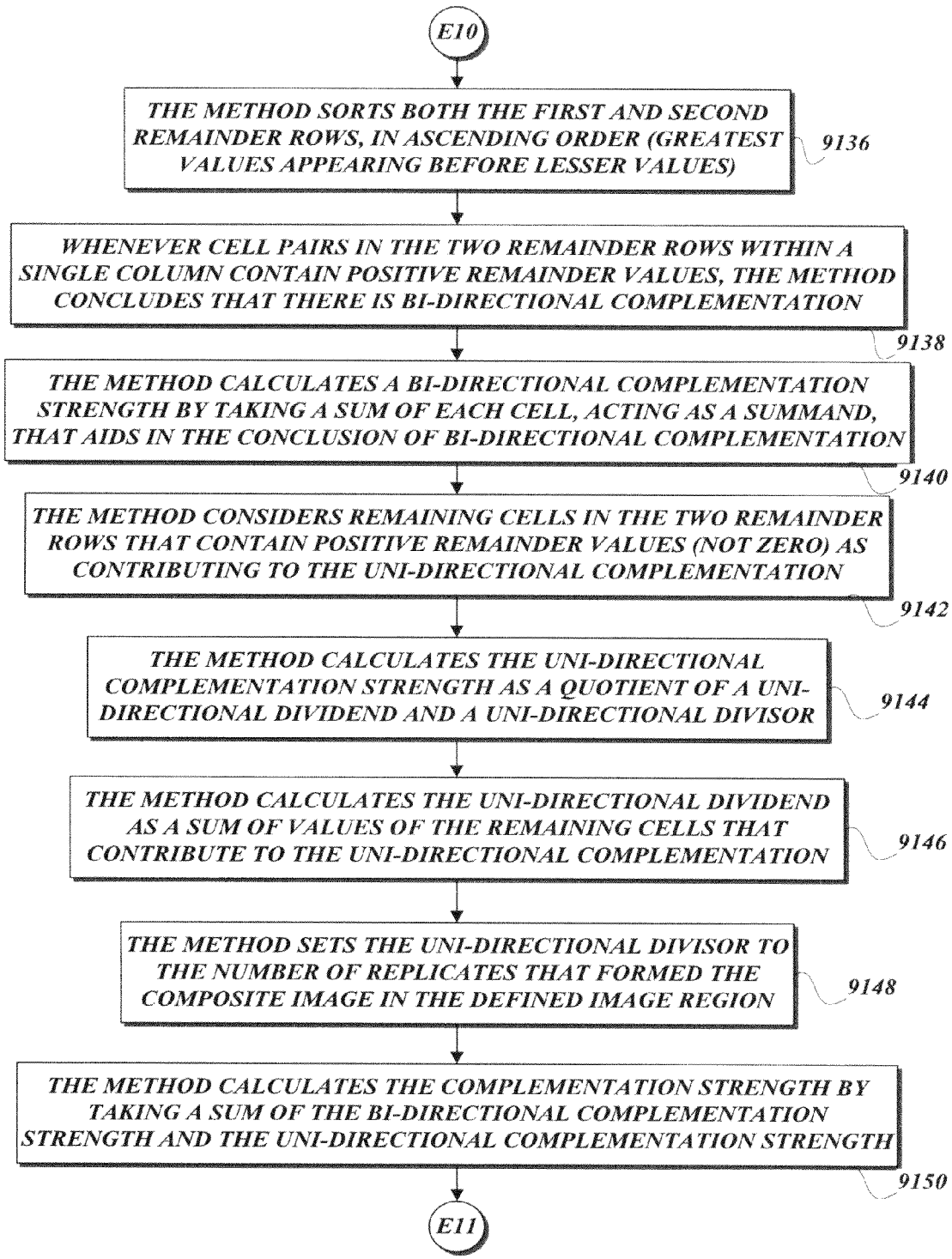
Figure 9Q:
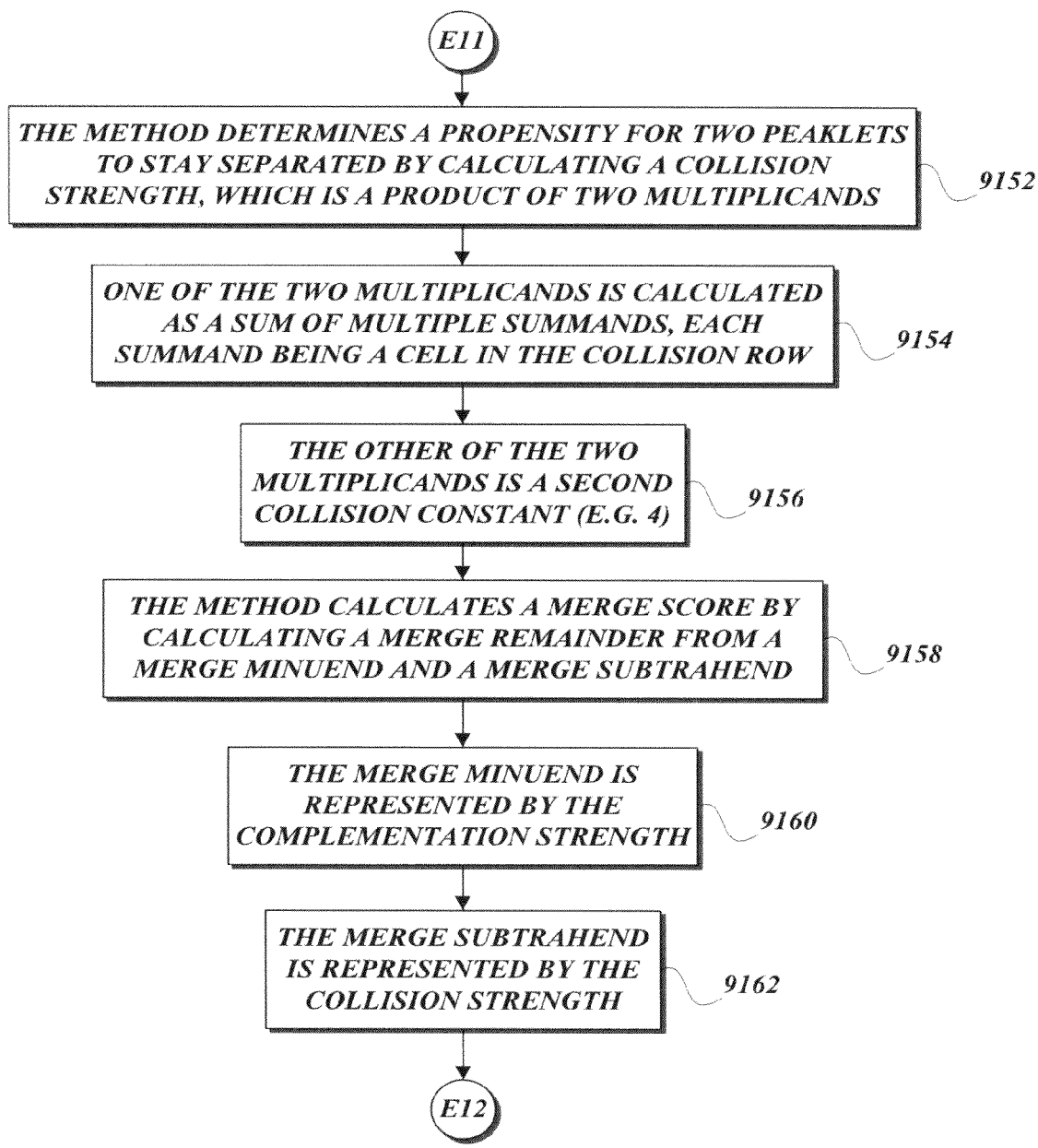
Figure 9R:
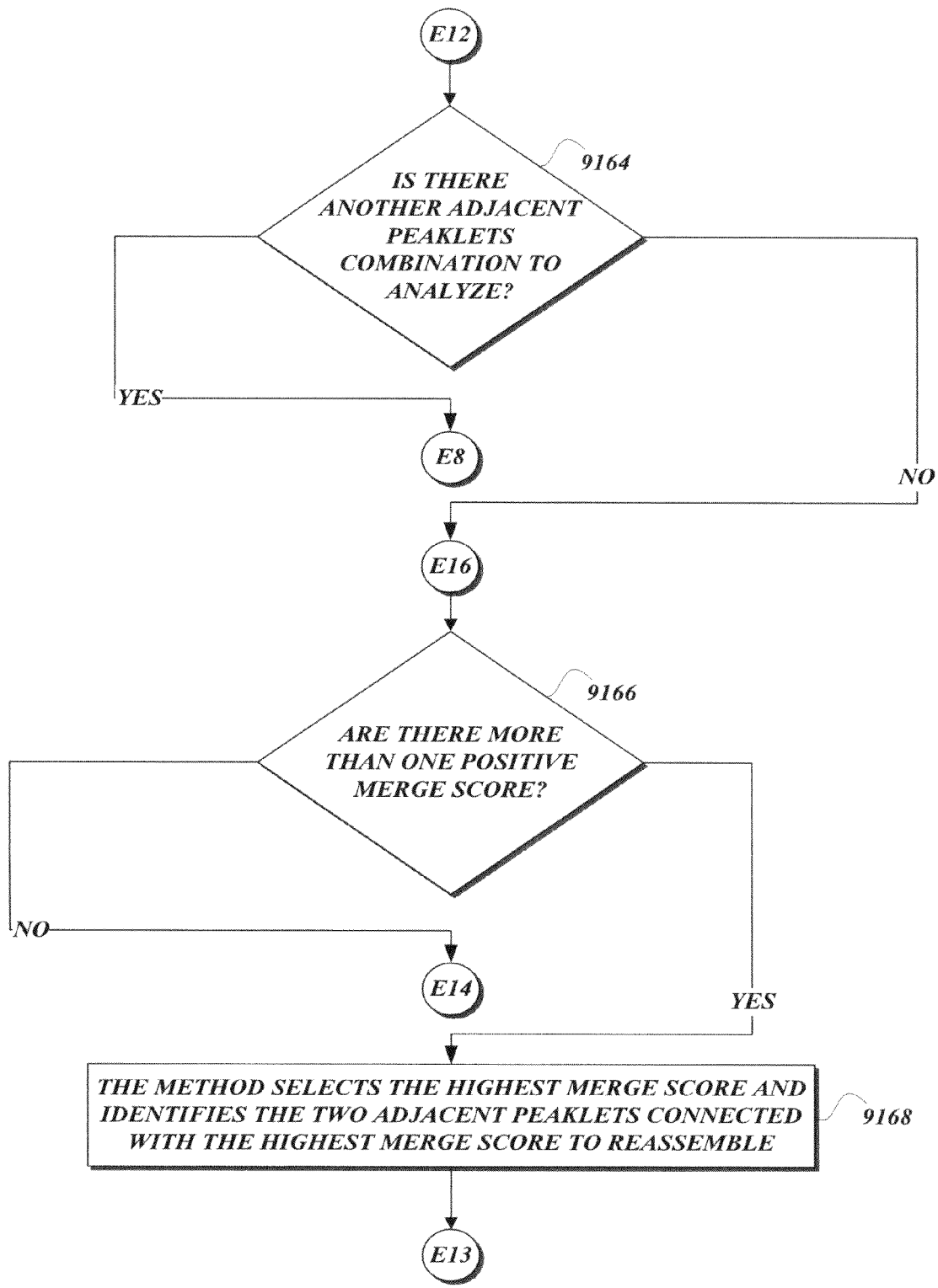
Figure 9S:
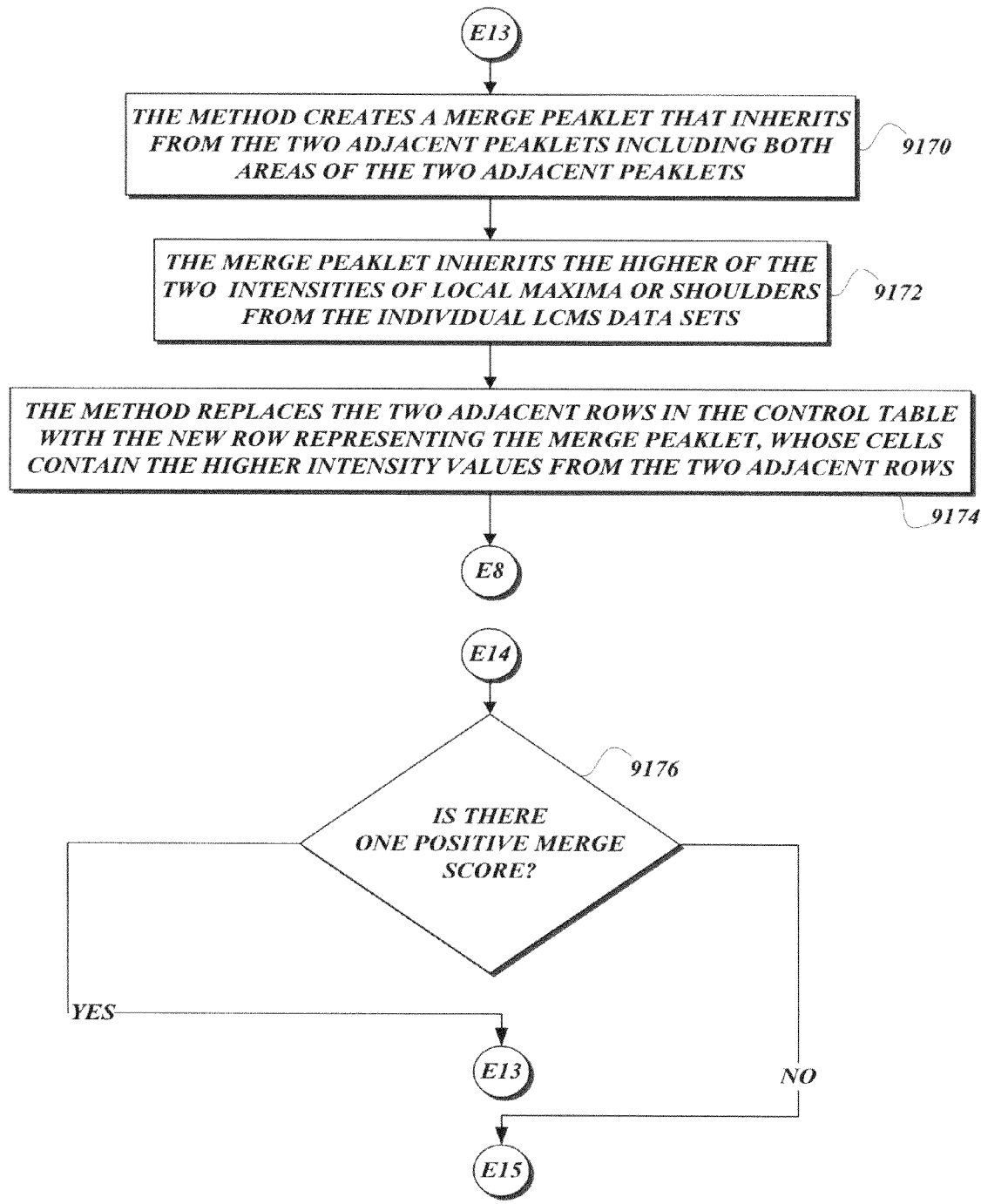
Figure 9T:
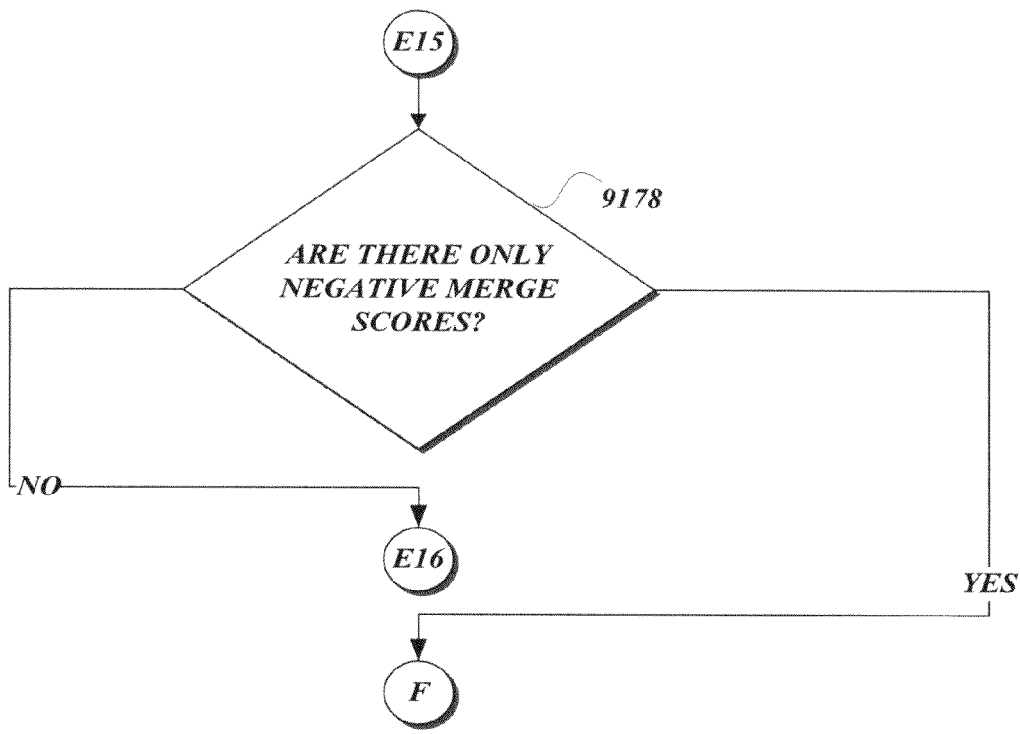

FIGS. 9A-9T illustrate a method 9000 for reassembling peaklets to discover biological features. From a start block, the method 9000 proceeds to a set of method steps 9002, defined between a continuation terminal ("Terminal A") and an exit terminal ("Terminal B"). The set of method steps 9002 describes the preparation of biological samples and the processing to produce composite images.

From Terminal A (FIG. 9B), the method 9000 proceeds to block 9008 where a control sample is set aside for an experiment. A treated sample is created at block 9010 from an experiment of different phenotypical or treatment conditions. At block 9012, prepared, control, and treated samples from one or more experiments are collected together for submission to the LC/MS instruments. LC/MS images (or replicates) at block 9014 are received by the method 9000 from the LC/MS instruments. At block 9016, the method 9000 superimposes peaks by aligning LCMS images in the retention time dimension resulting in some peaks that are aligned and other peaks that are not aligned. A composite image at block 9018 is produced containing mass spectrometry spectra in three dimensions, M/Z in the y-axis, retention time in the x-axis, and values of isotope peaks in the z-axis. The method then continues to exit Terminal B.

From Terminal B (FIG. 9A), the method 9000 proceeds to a set of method steps 9004, defined between a continuation terminal ("Terminal C") and an exit terminal ("Terminal D"). The set of method steps 9004 assembles peaklets that are likely to point to various biological features of interest.

From Terminal C (FIG. 9C), the method 9000 proceeds to block 9020 where the method segments the composite image, each segment containing a peaklet having an intensity maxima and related topological properties. Using thresholding at block 9022, a peaklets mask is created from the segmented composite image, each segment forming an area of the mask. At block 9024, the method 9000 labels each segment, thereby forming an array of segments, each identifiable by a label. Any suitable label type can be used, including numerical identifiers, textual identifiers, or a combination of both. The method 9000, at block 9026, determines a center pixel of each peaklet, whose coordinates determine a retention time center and a mass over charge (M/Z) center. The center pixel is calculated using a suitable algorithm including center of the area of the segment, intensity-weighted centroid, or pixel location of the intensity maximum. See block 9028. Many other suitable algorithms can be used.

Assuming intensity maximum is used, at block 9030, coordinates of intensity maxima are placed in the array at labeled rows, which correspond to labeled segments where the intensity maxima are found. The method 9000 then continues to another continuation terminal ("Terminal C1"). From Terminal C1 (FIG. 9C), the method proceeds to block 9032 where the method searches for the most intense peaklet. The method then continues to another continuation terminal ("Terminal C2"). From Terminal C2 (FIG. 9D), the method 9000 proceeds to decision block 9034 where a test is performed to determine whether the method found any peaklet to assemble. If the answer to the test at decision block 9034 is NO, the method proceeds to the exit Terminal D. If the answer to the test at decision block 9034 is YES, the method 9000 proceeds to another decision block 9036 where another test is performed to determine whether the found peaklet already is a member of an assemblage. If the answer to the test at decision block 9036 is YES, the method 9000 proceeds to Terminal C1 and skips back to block 9032 where the above-identified processing steps are repeated. If the answer at decision block 9036 is NO, the method 9000 proceeds to block 9038 where the method designates the found peaklet as the seed peaklet of a new assemblage. The method then continues to another continuation terminal ("Terminal C3").

From Terminal C3 (FIG. 9E), the method 9000 proceeds to block 9040 where the method designates the mass over charge (M/Z) center of the seed peaklet as the central M/Z for the assemblage. At block 9042, the method calculates the uncertainty connected with prospective peaklets that may be members of the assemblage. Using the uncertainty, the method at block 9046 calculates an M/Z tolerance from the M/Z center of the seed peaklet. Any suitable tolerance can be used based on the uncertainty. One suitable tolerance includes one pixel from the M/Z center of the seed peaklet. The method 9000 continues to another continuation terminal ("Terminal C4"). From Terminal C4, the method 9000 proceeds to decision block 9048 where a test is performed to determine whether there is a suitable peaklet to analyze from the composite image. If the answer to the test at decision block 9048 is YES, the method 9000 proceeds to another continuation terminal ("Terminal C5"). If, on the other hand, the answer to the test at decision block 9048 is NO, the method continues to Terminal C1 (FIG. 9C) where it skips back to block 9032 and repeats the above-identified processing steps.

From Terminal C5 (FIG. 9F), the method 9000 proceeds to decision block 9050 where a test is performed to determine whether the peaklet is already a member of an assemblage. If the answer to the test at decision block 9050 is YES, the method proceeds to block 9052 where the method disregards the peaklet. The method then continues to Terminal C4 and skips back to decision block 9048 to repeat the above-identified processing steps. If the answer to the test at decision block 9050 is NO, the method 9000 proceeds to another decision block 9054 where another test is performed to determine whether the M/Z center of the peaklet is the same as the seed peaklet. If the answer to the test at decision block 9054 is YES, the method 9000 proceeds to another continuation terminal ("Terminal C7"). On the other hand, if the answer to the test at decision block 9054 is NO, the method 9000 proceeds to another continuation terminal ("Terminal C6").

From Terminal C6 (FIG. 9G), the method 9000 proceeds to decision block 9056 where a test is performed to determine whether the M/Z center of the peaklet is within tolerance of the seed peaklet. For example, if the M/Z center of the peaklet is one pixel away, on the y-axis describing the mass/charge dimension, the M/Z center of the peaklet is indeed within tolerance of the seed peaklet if the tolerance is one pixel. If the answer to the test at decision block 9056 is NO, the method continues to block 9058 where the method disregards the peaklet. The method then continues to Terminal C4 and skips back to decision block 9048 where the above-identified processing steps are repeated. If the answer to the test at decision block 9056 is YES, the method continues to Terminal C7 (FIG. 9G) and proceeds further on to decision block 9060 where a test is performed to determine whether peaklet pixels exist at the assemblage's M/Z center. If the answer to the test at decision block 9060 is YES, the method continues to another continuation terminal ("Terminal C8"). Otherwise, if the answer to the test at decision block 9060 is NO, the method 9000 proceeds to another continuation terminal ("Terminal C11").

From Terminal C8 (FIG. 9H), the method proceeds to block 9061 where the method focuses only on the pixels at the M/Z center of the assemblage for the next test. The method 9000 proceeds to decision block 9062 where a test is performed to determine whether the peaklet is within three pixels from the assemblage. In other words, the method tests to see whether there is a peaklet pixel at the assemblage's center M/Z that is within a suitable distance (such as three pixels) of an assemblage pixel at the assemblage's center M/Z. Any suitable distance can be used and not only three pixel distances. If the answer to the test at decision block 9062 is YES, the method proceeds to block 9064 where the method determines that the peaklet is an adjacent peaklet. The method then continues to another continuation terminal ("Terminal C10"). If the answer to the test at decision block 9062 is NO, the method continues to Terminal C11 (FIG. 9H), and further proceeds to block 9066 where the method calculates an alignment uncertainty time (such as two peak widths). The peak widths used for the calculation of alignment uncertainty suitably is determined prior to the peak reassembly process, and the peak width is considered suitably in the retention time dimension. A peak width can have any suitable definition. One suitable definition includes the width of the peak at half maximum intensity or is the median peak width of all peaks in an experiment definition. At block 9068, the method 9000 locates the retention time center of the peaklet and adds to it the alignment uncertainty time to produce a distance. The method then continues to another continuation terminal ("Terminal C9").

From Terminal C9 (FIG. 9I), the method proceeds to decision block 9070 where a test is performed to determine whether the center of the assemblage's closest peaklet can be reached by the distance previously calculated. If the answer to the test at decision block 9070 is YES, the method determines that the peaklet is an adjacent peaklet. See block 9072. The method then continues to Terminal C10. If the answer to the test at decision block 9070 is NO, the method continues to Terminal C1 where it skips back to block 9032 and repeats the above-identified processing steps. From Terminal C10 (FIG. 9I), the assemblage is extended by the addition of the peaklet. See block 9074. The method then continues to Terminal C1 and skips back to block 9032 where the above-identified processing steps are repeated.

From Terminal D (FIG. 9A), the method 9000 proceeds to a set of method steps 9006, defined between a continuation terminal ("Terminal E") and an exit terminal ("Terminal F"). The set of method steps 9006 reassembles peaklets after calculation of complementation scores and collision scores.

From Terminal E (FIG. 9J), the method 9000 proceeds to decision block 9076 where a test is performed to determine whether there is any assemblage left to reassemble. If the answer to the test at decision block 9076 is NO, the method proceeds to exit Terminal F and terminates execution. If the answer to the test at decision block 9076 is YES, the method proceeds to block 9078 where the method selects an assemblage to analyze. At block 9080, the method defines an image region in the composite image that encompasses the assemblage in the retention time dimension and in the M/Z dimension around the central M/Z and its tolerance. The method at block 9082 collects replicates that formed the composite image in the defined image region. The method then creates a chromatogram from each collected replicate, which describes pixel intensities for the defined image region in the retention time dimension. See block 9084. The method then continues to another continuation terminal ("Terminal E1").

From Terminal E1 (FIG. 9K), the method proceeds to block 9086 where the method locates all local maxima of a chromatogram. At block 9088, the method locates all shoulders of the chromatogram, each shoulder limited by a region contained within two inflection points that do not contain a local maximum. At block 9090, the method calculates the retention time of each shoulder by locating a minimum of a Laplacian transform and an intensity of each shoulder that is derived from tangent skimming. The method then continues to another continuation terminal ("Terminal E2") and proceeds further to block 9092 where the method gathers local maxima and shoulders with retention time periods that overlap with a retention time period of a peaklet member of the assemblage. At decision block 9094, a test is performed to determine whether there is any overlap. If the answer to the test at decision block 9094 is NO, the method continues to another continuation terminal ("Terminal E4"). If the answer to the test at decision block 9094 is YES, the method continues to another continuation terminal ("Terminal E3").

From Terminal E3 (FIG. 9L), the method proceeds to decision block 9096 where a test is performed to determine whether there is more than one local maximum or shoulder. If the answer to the test at decision block 9096 is NO, the method continues to another continuation terminal ("Terminal E6"). If the answer to the test at decision block 9096 is YES, the method continues to another decision block 9098 where a test is performed to determine whether there is a most intense local maximum. If the answer to the test at decision block 9098 is NO, the method continues to another continuation terminal ("Terminal E5"). If the answer to the test at decision block 9098 is YES, the method continues to block 9100 where the method associates the most intense local maximum (thereby associating a chromatogram of the replicate at the corresponding retention time period) with the peaklet. The method then continues to Terminal E4.

From Terminal E4 (FIG. 9M), the method proceeds to decision block 9102 where a test is performed to determine whether the assemblage has another peaklet to analyze. If the answer to the test at decision block 9102 is YES, the method continues to Terminal E2 where it skips back to block 9092 and repeats the above-identified processing steps. If the answer to the test at decision block 9102 is NO, the method continues to decision block 9104 where another test is performed to determine whether there is another chromatogram to analyze. If the answer to the test at decision block 9104 is YES, the method continues to Terminal E1 and skips back to block 9086 where the above-identified processing steps are repeated. If the answer to the test at decision block 9104 is NO, the method continues to block 9106 where the method constructs a control table with each column representing an LCMS data set (chromatogram or replicate) and each row representing a peaklet from the assemblage. At block 9108, the method arranges the rows so that adjacent peaklets are represented by adjacent rows. The method then continues to another continuation terminal ("Terminal E7").

From Terminal E5 (FIG. 9N), the method associates the most intense shoulder (thereby associating a chromatogram of the replicate at the corresponding retention time period) with the peaklet. See block 9110. The method then continues to Terminal E4 and skips back to decision block 9102 where the above-identified processing steps are repeated.

From Terminal E6 (FIG. 9N), the method associates the local maximum (only in its absence the shoulder) to thereby associate a chromatogram of the replicate at the corresponding retention time period with the peaklet. See block 9112. The method then continues to Terminal E4 and skips back to decision block 9102 where the above-identified processing steps are repeated. From Terminal E7 (FIG. 9N), the method populates each cell of the table with an intensity of a local maximum or shoulder that corresponds with the LCMS data set within an associated peaklet. See block 9114. In the absence of local maxima or shoulders, the method populates those cells with zero values. See block 9116. The method then continues to another continuation terminal ("Terminal E8") and continues further to block 9118 where the method selects two adjacent rows (first peaklet row and second peaklet row representing two adjacent peaklets) and creates an analysis table for merging analyses. The method then continues to another continuation terminal ("Terminal E9").

From Terminal E9 (FIG. 9O), the method creates a collision row at block 9120, which cells (defined as collision components) contain the lower of two values in corresponding adjacent cells of the respective adjacent rows. At block 9122, the method creates two new rows in the analysis table (defined as a first remainder row and a second remainder row). At block 9124, each cell in the first remainder row is a remainder of a first minuend and a collision subtrahend. At block 9126, each first minuend is a value taken from a corresponding cell (within a corresponding column of the analysis table) of the first peaklet row. Each collision subtrahend is a product of a first collision constant (for example, 3), and a corresponding collision component (corresponding cell of the collision row). See block 9128. At block 9130, each cell in the second remainder row is a remainder of a second minuend and the collision subtrahend. Each second minuend is a value taken from a corresponding cell (within a corresponding column of the analysis table) of the second peaklet row. See block 9132. At block 9134, if any remainder is negative, the remainder is set to zero. The method then continues to another continuation terminal ("Terminal E10").

From Terminal E10 (FIG. 9P), the method continues to block 9136 where the method sorts both the first and second remainder rows, in ascending order (greatest values appearing before lesser values). Whenever cell pairs in the two remainder rows within a single column contain positive remainder values, the method at block 9138 concludes that there is bidirectional complementation. At block 9140, the method calculates a bidirectional complementation strength by taking a sum of each cell, each acting as a summand, that aids in the conclusion of bi-directional complementation. The method considers at block 9142 the remaining cells in the two remainder rows that contain positive remainder values (not zero) as contributing to the uni-directional complementation.

At block 9144, the method calculates the uni-directional complementation strength as a quotient of a uni-directional dividend and a uni-directional divisor. The method calculates the uni-direction dividend as a sum of values of the remaining cells that contribute to the uni-directional complementation. See block 9146. The method sets the uni-directional divisor to the number of replicates that formed the composite image in the defined image region. See block 9148. The method then calculates the complementation strength by taking a sum of the bi-directional strength and the uni-directional complementation strength. See block 9150. The method then continues to another continuation terminal ("Terminal E11").

From Terminal E11 (FIG. 9Q), the method determines a propensity for two peaklets to stay separated by calculating a collision strength, which is a product of two multiplicands. See block 9152. At block 9154, one of the two multiplicands is calculated as a sum of multiple summands, each summand being a cell in the collision row. The other of the two multiplicands is a second collision constant (e.g., 4). See block 9156. At block 9158, the method calculates a merge score by calculating a merge remainder from a merge minuend and a merge subtrahend. The merge minuend is represented by the complementation strength. See block 9160. The merge subtrahend is represented by the collision strength. See block 9162. The method 9000 then continues to another continuation terminal ("Terminal E12").

From Terminal E12 (FIG. 9R), the method 9000 proceeds to decision block 9164 where a test is performed to determine whether there is another adjacent peaklets combination to analyze. If the answer to the test at decision block 9164 is YES, the method continues to Terminal E8 and skips back to block 9118 where the above-processing steps are repeated. If the answer to the test at decision block 9164 is NO, the method continues to another continuation terminal ("Terminal E16") and further continues to decision block 9166 where a test is performed to determine whether there is more than one positive merge score. If the answer to the test at decision block 9166 is NO, the method continues to another continuation terminal ("Terminal E14"). Otherwise, if the answer to the test at decision block 9166 is YES, the method continues to block 9168 where the method selects the highest merge score and identifies the two adjacent peaklets connected with the highest merge score to reassemble. The method then continues to another continuation terminal ("Terminal E13").

From Terminal E13 (FIG. 9S), the method continues to block 9170 where the method creates a reassembled peaklet from the two adjacent peaklets including both areas of the two adjacent peaklets. At block 9172, the reassembled peaklet inherits the higher of the two intensities of local maxima or shoulders from the individual LCMS data sets. The method replaces the two adjacent rows in the control table with the new row representing the reassembled peaklet, whose cells contain the higher intensity values from the two adjacent rows. See block 9174. The method then continues to Terminal E8 and skips back to block 9118 where the above-identified processing steps are repeated.

From Terminal E14 (FIG. 9S), the method proceeds to decision block 9176 where a test is performed to determine whether there is one positive merge score. If the answer to the test at decision block 9176 is YES, the method continues to Terminal E13 and skips back to block 9170 where the above-identified processing steps are repeated. Otherwise, if the answer to the test at decision block 9176 is NO, the method continues to another continuation terminal ("Terminal E15").

From Terminal E15 (FIG. 9T), the method continues to decision block 9178 where a test is performed to determine whether there are only negative merge scores. If the answer to the test at decision block 9178 is NO, the method continues to Terminal E16 and skips back to decision block 9166 where the above-identified processing steps are repeated. Otherwise, if the answer to the test at decision block 9178 is YES, the method continues to Terminal F and terminates execution.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system for reassembling assembled peaks in a composite digital image representing liquid chromatography or mass spectrometry data, the system comprising:
    a peaklets assembler configured to form an assemblage of peaks in the composite image by identifying a seed peak having a first mass/charge ratio and identifying other peaks adjacent to the seed peak that each have a mass/charge ratio within a calculated tolerance from the first mass/charge ratio, each peak in the assemblage having a likelihood of representing the same biological feature of interest; and a peaks reassembler configured to revise the assemblage by creating chromatograms from replicates that form the composite image in a defined image region that contains the assemblage, the peaks reassembler reassembling peaks to indicate that the peaks represent the same biological feature of interest when a computed bi-directional complementation strength together with a computed unidirectional complementation strength is greater than a computed collision strength, wherein bi- and uni-directional complementation strength indicate a likelihood that peaks represent the same biological feature, and collision strength indicates a likelihood that peaks represent distinct biological features.

2. The system of claim 1, further comprising an aligner that aligns peaks of one replicate with peaks with another replicate in a retention time dimension to produce an aligned image with aligned peaks and non-aligned peaks, the aligned image used to produce the composite image.

3. The system of claim 1, further comprising a peaklets labeler that labels each peak in the assemblage with an identifier selected from a group consisting of numerical labels, textual labels, or a combination of numerical and textual labels.

4. The system of claim 1, further comprising a peaklets center finder that finds a center of each peak using a technique selected from a group consisting of center of the area of a segment where the peak is located, intensity-weighted centroid, or pixel locations of an intensity maximum.

5. The system of claim 1, further comprising a sorter that sorts peaks by the mass/charge locations of their centers.

6. A computer-implemented method, comprising:
aligning replicates in a retention time dimension to overlay peaks in one replicate with peaks in another replicate resulting in aligned peaks and non-aligned peaks, each replicate representing liquid chromatography or mass spectrometry data;
forming a composite digital image containing both the aligned peaks and the non-aligned peaks;
assembling a plurality of the peaks in the composite digital image into an assemblage of peaks, each peak in the assemblage having a likelihood of representing the same biological feature of interest; and
revising the assemblage by reassembling adjacent peaks that are part of the assemblage if a computed bi-directional complementation strength together with a computed uni-directional complementation strength is greater than a computed collision strength,
wherein bi- and uni-directional complementation strength indicate a likelihood that peaks represent the same biological feature, and
wherein collision strength indicates a likelihood that peaks represent distinct biological features.

7. The computer-implemented method of claim 6, further comprising finding the assemblage by starting with a seed peak that has more intensity than other peaks and using a mass/charge center of the seed peak together with a calculated tolerance to identify prospective peaks that may be added to the assemblage.

8. The computer-implemented method of claim 7, further comprising adding a prospective peak to the assemblage if the mass/charge center of the prospective peak is within the calculated tolerance of the mass/charge center of the seed peak and the prospective peak is adjacent to the assemblage.

9. The computer-implemented method of claim 8, further comprising creating chromatograms from corresponding replicates that define an image region in the composite image that encompasses the assemblage in the retention time dimension.

10. The computer-implemented method of claim 9, further comprising associating a local maximum or shoulder of a chromatogram with a peak of the assemblage if the local maximum is the most intense local maximum or shoulder and repeating the act of associating for the remaining chromatograms.

11. The computer-implemented method of claim 10, further comprising constructing a table on a computer-readable medium with each column representing a chromatogram and each row representing a peak from the assemblage, each adjacent row being representative of adjacent peaks, each cell of the table being populated by an intensity of a local maximum or shoulder that corresponds with a chromatogram within an associated peak.

12. The computer-implemented method of claim 11, further comprising selecting two adjacent rows, one being a first peaklet row and another being a second peaklet row, and forming an analysis table for reassembly analysis from the first peaklet row and the second peaklet row.

13. The computer-implemented method of claim 12, further comprising creating a collision row, in which cells defined as collision components contain a lower of two values in the first peaklet row and the second peaklet row.

14. The computer-implemented method of claim 13, further comprising creating a first remainder row and a second remainder row, each cell of the first remainder row containing a remainder of a first minuend and a collision subtrahend, each first minuend being a value taken from a corresponding cell of the first peaklet row, each collision subtrahend being a product of a first collision constant and a corresponding collision component, each cell of the second remainder row containing a remainder of a second minuend and the collision subtrahend, the second minuend being a value taken from a corresponding cell of the second peaklet row, each cell being set to zero if its value is negative.

15. The computer-implemented method of claim 14, further comprising sorting the first remainder row and the second remainder row in ascending order and concluding that there is bidirectional complementation whenever cell pairs in the two remainder rows within a single column of the analysis table contain positive remainder values.

16. The computer-implemented method of claim 15, further comprising calculating bi-directional complementation strength by taking a sum of each cell of the two remainder rows that aids in the conclusion of bidirectional complementation.

17. The computer-implemented method of claim 16, further comprising calculating uni-directional complementation strength by concluding that the remaining cells in the two remainder rows that contain positive remainder values contribute to uni-directional complementation, the uni-directional complementation strength being a quotient of a uni-directional dividend and a uni-directional divisor, the unidirectional dividend being a sum of values of the remaining cells in the two remainder rows that contribute to the uni-directional complementation, and the uni-directional divisor being set to the number of replicates.

18. The computer-implemented method of claim 17, further comprising calculating the collision strength by taking a product of two multiplicands, one of the two multiplicands being a sum of multiple summands, each summand being a cell in the collision row, the other of the two multiplicands being a second collision constant.

\* \* \* \* \*